Feb. 1, 1944.  C. R. DOTY ET AL  2,340,801
RECORD CONTROLLED PERFORATING APPARATUS
Filed July 2, 1942   14 Sheets-Sheet 11

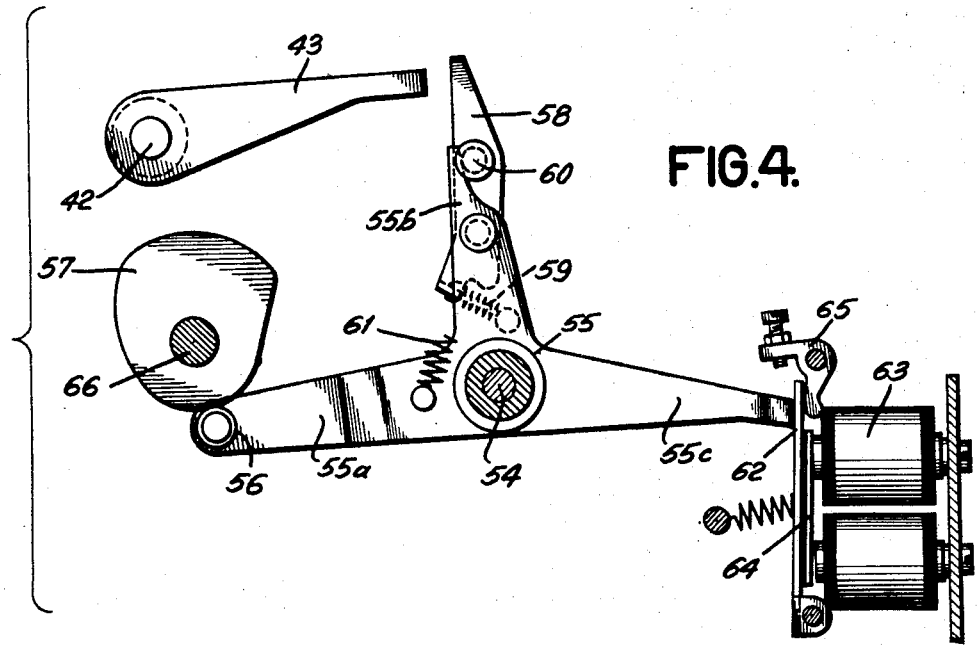
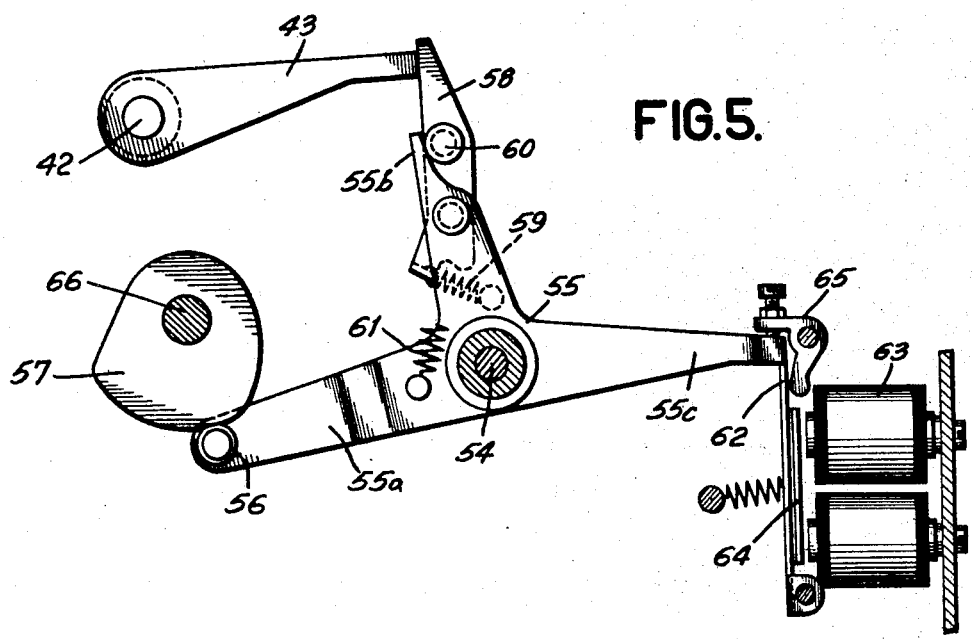

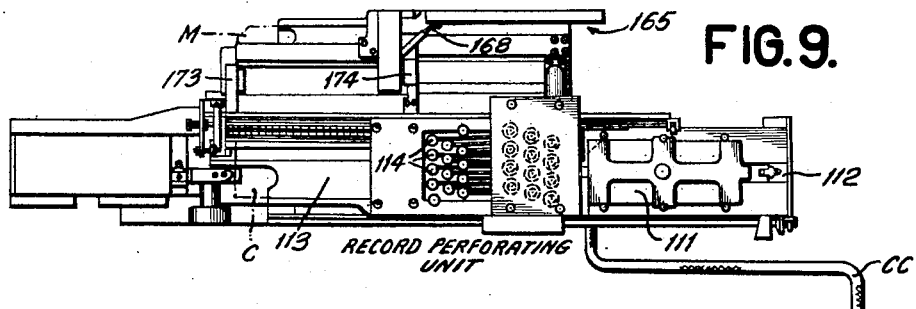
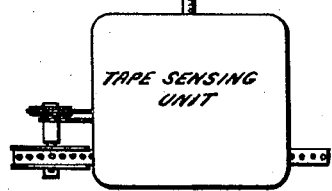
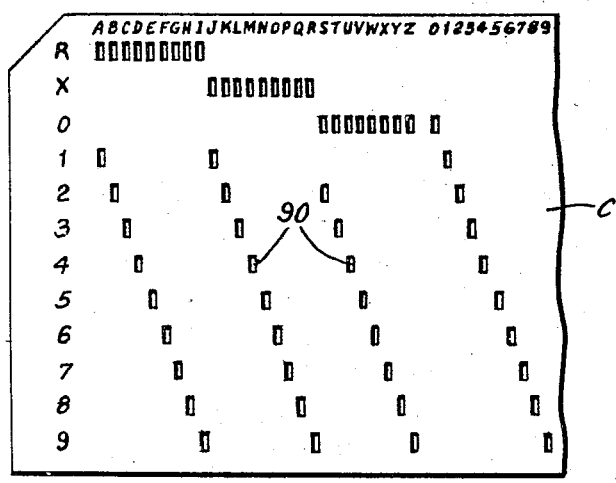
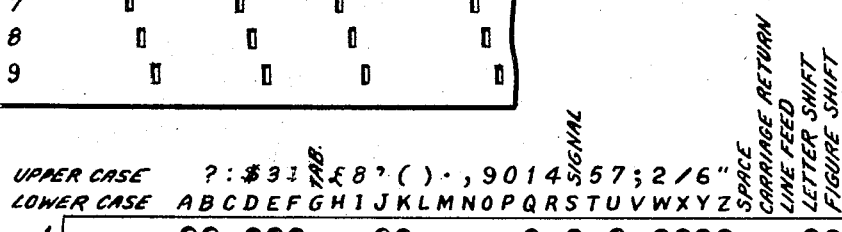
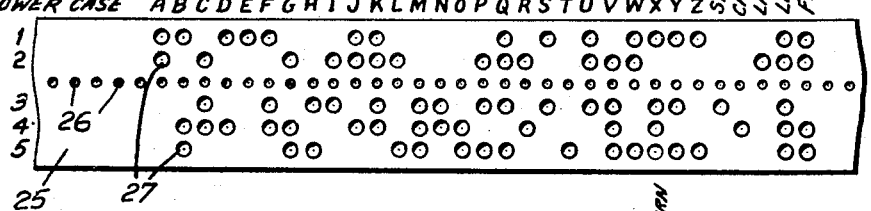
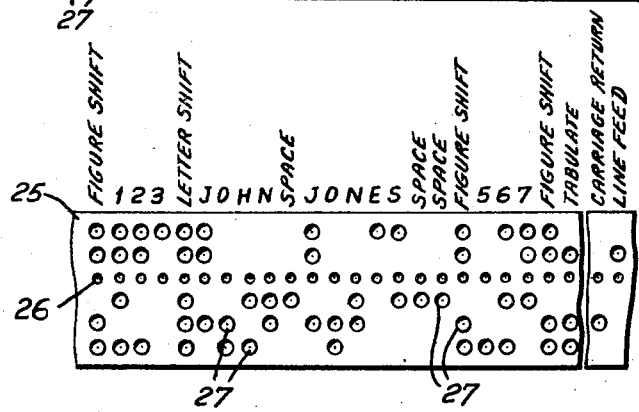

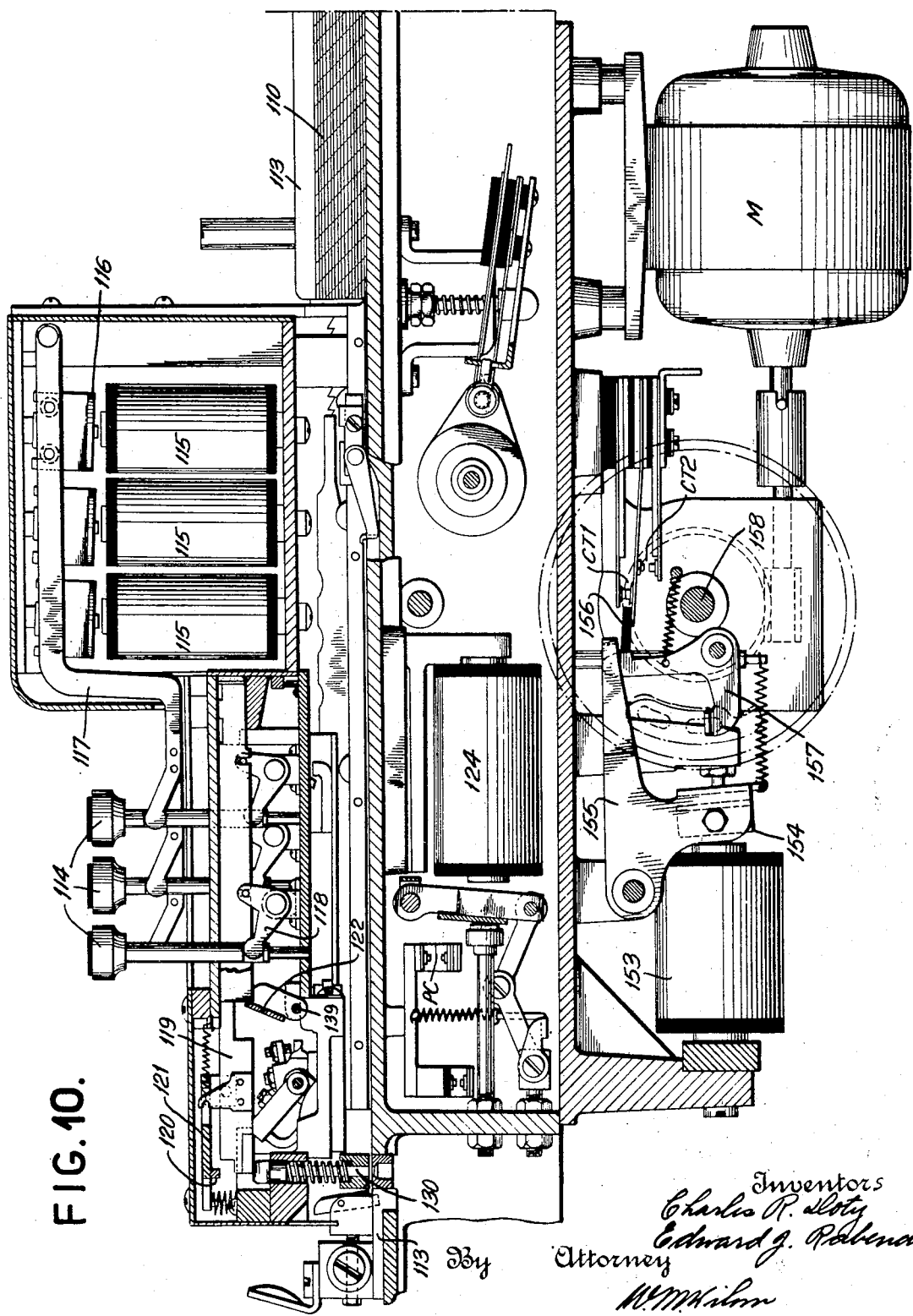

INVENTORS
Charles R. Doty
Edward J. Rabenda
BY
W. P. Wilson  ATTORNEY.

Feb. 1, 1944.  C. R. DOTY ET AL  2,340,801
RECORD CONTROLLED PERFORATING APPARATUS
Filed July 2, 1942  14 Sheets—Sheet 12

Patented Feb. 1, 1944

2,340,801

UNITED STATES PATENT OFFICE 2,340,801

RECORD CONTROLLED PERFORATING APPARATUS

Charles R. Doty, Yonkers, and Edward J. Rabenda, Binghamton, N. Y., assignors to International Business Machines Corporation, New York, N. Y., a corporation of New York Application July 2, 1942, Serial No. 449,445

49 Claims. (Cl. 164—115)

This invention relates to record controlled perforating apparatus, and more particularly to such apparatus wherein the data designations are recorded on a sheet in a code which is different from the code of the data designations sensed on the control record.

A primary object of the present invention resides in the provision of improved apparatus whereby the information recorded on telegraphic tape, suitable for controlling the operations of remotely situated printing telegraph transmission and recording devices, may be recorded in statistical or tabulating sheets or cards.

In the usual printing telegraph or teletypewriter systems, a five-unit Baudot or Teletype selecting code is employed to represent the various symbols to be transmitted. This code provides a maximum of thirty two different combinations so that thirty two different signals may be transmitted over the telegraph system by this code. In order to enable the transmission of more than thirty two different characters and symbols, the same code combinations, for example, are employed for designating alphabetical and numerical data; thus, it is necessary, for intermixed alphabetical and numerical data, to employ a key signal for identifying the data designating code combinations or signals as alphabetical or numerical. Also, when teletypewriters or "printers" are controlled by telegraphic tapes, it is necessary that the "functional" signals (such as "carriage return") which control the teletypewriters type basket position are punched in the tape in position to be sensed before the signal representing the character next to be printed is sensed. The mentioned key signals are punched in the tape in position to be sensed before the signal designating the first character to be printed in a new line is sensed, also before the first numeral signal following a letter signal, or vice versa, that may occur during the printing of a line.

Accordingly, the following provisions must be made in the telegraphic tape, (1) that the "letters" and "figures" key signals or codes must be perforated in the tape preceding the character designating perforations to indicate whether the coded perforations designate alphabetical or numerical data, and (2) that "carriage return" and "line feed" signals or codes must be perforated in the tape before the character designations of the next line are recorded on the tape. These latter signals return the teletypewriter carriage to the left-hand margin, and space the paper to the next printing line.

In stating that the key signals precede certain character designating perforations, we refer to the order in which the characters are printed, which is not necessarily the order in which they will be read, as in reverse printing systems. "Carriage return" refers to the backward relative movement of the type basket and platen along the printing line, which in some machines is executed by the type basket, in others by the platen.

In the present commercial statistical or tabulating systems, it is common practice to record the information or data on tabulating cards by perforations which are arranged, singly or in different combinations, in different positions in adjacent vertical columns. The statistical code, such as the Hollerith code, employed in such tabulating systems is wholly different from the five-unit code used in printing telegraph systems.

Thus, whenever it is desired to prepare statistical cards in accordance with the data contained on a telegraphic tape, and automatically under the control of such tapes, it is necessary to provide the following features, (1) suitable translating means whereby the sensed data in telegraphic code on the tapes are automatically converted into, and recorded on the cards, in the statistical code, (2) suitable means for determining whether the data on the tape are of the alphabetical or numerical group, and automatically providing the perforating the corresponding data on the statistical cards, and (3) suitable means for determining the presence of the "letters" or "figures" key code on the tape and preventing these key code designations from operating the card punch elements.

In the prior art, systems have been shown for analyzing coded data designating perforations in a tape, converting the analyzed code into a statistical code, and controlling statistical card punch elements in accordance with the analyzed data. The United States patent to Carroll No. 1,976,600, issued October 9, 1934; the U. S. Patent No. 2,160,152, issued to W. F. Kelley, May 30, 1939; U. S. Patent No. 2,172,754, issued to Lasker and Kelley, September 12, 1939; and U. S. Patent No. 2,183,820, issued to Nelson and Johnston, December 19, 1939, are examples of the mentioned prior art systems. In another prior art system shown in Nelson Patent No. 1,927,556, statistical data punched in cards in one code are telegraphically transmitted and punched at a receive station in another code. However, these mentioned systems are not arranged for analyzing the standard telegraphic tape containing data designations recorded in Baudot code, which designations are preceded by "letters" and "figures" key code designations for indicating whether the data designations belong to alphabetical or numerical groups, and controlling the operations of statistical card punching means accordingly.

The specific embodiment to be described serves merely as one illustrative form of the invention, and comprises a suitable telegraphic tape reader or sensing unit whereby the transverse rows of key and data designations are presented successively, step by step, to the individual sensing elements. Groups of translating and distributing relays are selectively controlled by the sensing elements for translating or converting the telegraphic Baudot code into the Hollerith code, and controlling selectively the energization of the card punch magnets so that the alphabetical and numerical data sensed on the tape are recorded in statistical code on the cards. "Letters" and "figures" control circuits are provided, and are controlled selectively, under the influence of the sensing elements, for supervising the conditioning of the card punch control circuits (controlled by the said translating and distributing relays), whereby the key code designations per se exercise no controlling effects on the punch magnets, but cause proper operations of the punch elements in accordance with the immediate subsequently analyzed character designations associated with their representative key code designations. In the instant case, the "letters" or "figures" supervisory control means are maintained effective, until the other key code designation is effective to control its related supervisory means. Circuits, under control of a punch column read-out device are also provided for preventing tape sensing and feeding operations during the periods the card punch unit performs certain automatic functional operations, such as card ejecting and carriage return operations, duplicating and tabulating operations, and, upon completion thereof, automatically renewing tape sensing and feeding operations. Additional control circuits are arranged for cooperating with the said read-out device, which circuits function as means for checking all the functional operations of the tape sensing and card punching units to determine whether their operations are completed in unison, upon completion of each card punching cycle, by utilizing the "carriage return" and "line feed" code designations as checking signals.

Accordingly, in addition to the mentioned features, another object of the present invention resides in the provision of an improved recording apparatus, wherein telegraphic records are sensed for controlling the operations of statistical sheet recording means in accordance with the sensed telegraphic data, and having means which are responsive to certain key code designations for determining whether the data to be recorded belong to the numerical or alphabetical data group.

Another object of the present invention resides in the provision of an improved perforating apparatus wherein the "letters" or "figures" supervisory control means are maintained effective for controlling the statistical sheet perforating means, until the other key code designation is effective for controlling its related supervisory means.

Another object of the present invention resides in the provision of an improved perforating apparatus wheren cyclically operable means are provided for rendering the telegraphic tape sensing and feeding means effective successively, at predetermined times, during each cycle of operation of the tape sensing unit.

Another object of the present invention resides in the provision of an improved perforating apparatus wherein read-out means are provided for automatically controlling the stopping and starting operations of the telegraphic tape sensing unit, respectively, during certain of the functional operations of the card perforating means, such as sheet ejection and carriage return operations, tabulating and duplicating operations.

Still another object of the present invention resides in the provision of an improved perforating apparatus wherein checking means are provided, which are capable of utilizing predetermined signals, such as "carriage return" and "line feed" signals, for determining whether all the functional operations of the tape sensing and card perforating units are completed in unison, upon the completion of each cycle of operation of the said perforating unit.

Other objects of the invention will be pointed out in the following description and claims and illustrated in the accompanying drawings, which disclose, by way of example, the principle of the invention and the best mode, which has been contemplated, of applying that principle.

In the drawings:

Figs. 4 and 5 are detail views showing different stages of operations of certain elements of the tape sensing unit.

Fig. 7 is a detail showing the telegraphic code employed herein.

Fig. 7A is a fragmentary section of a telegraphic tape bearing an exemplary message.

Fig. 8 is a detail of a statistical record card having coded data designating perforations formed therein in statistical code.

Fig. 9 is a plan view of the record card perforating unit and diagrammatically showing the electrically connected tape sensing unit.

Fig. 10 is a sectional view illustrating details of construction of the record card perforating unit.

Figure 1:
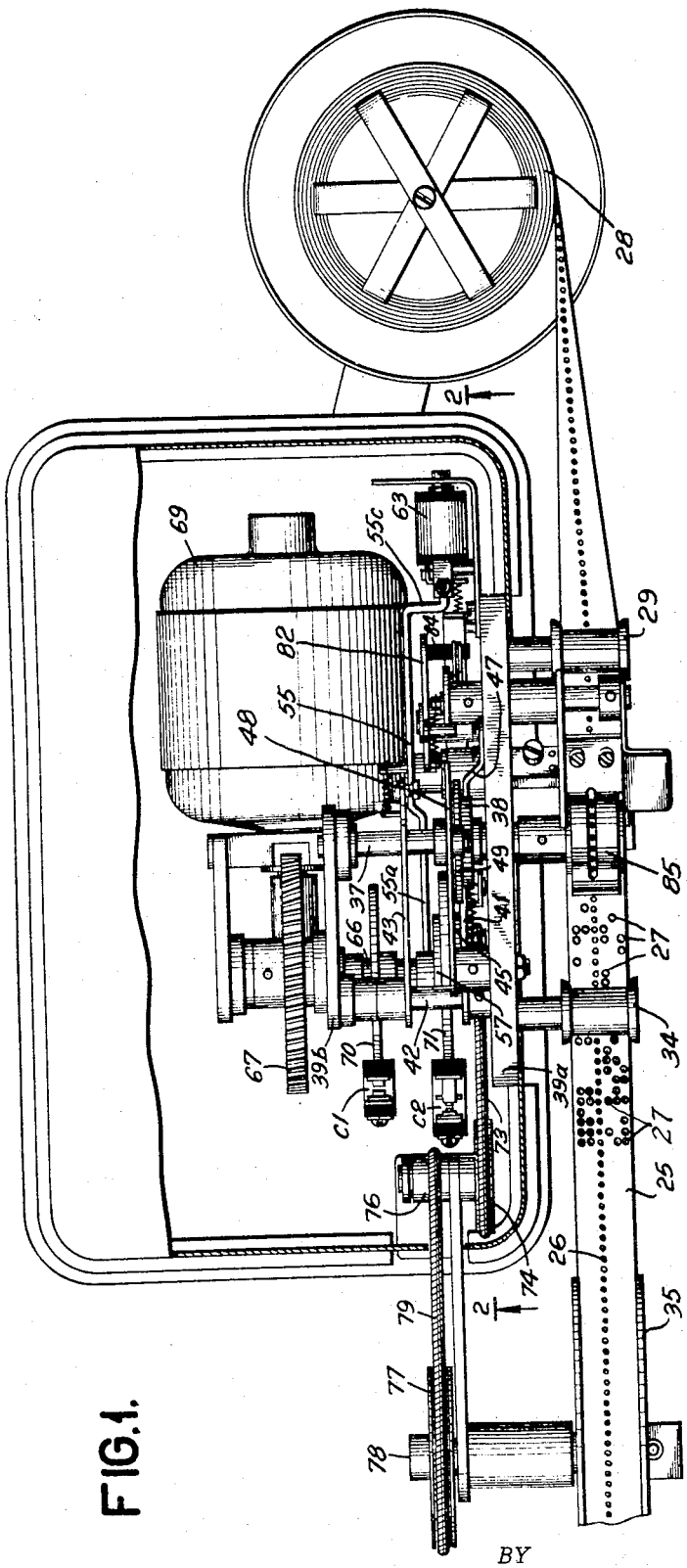
Fig. 1 is a plan view of the telegraphic tape sensing unit.

Figs. 14A to 14F arranged sequentially below each other is a diagram of the circuit connections of the apparatus.

General description

Before describing in detail the individual tape sensing and record perforating units, which are shown electrically connected in Fig. 9, by a cable connection CC, and the operation of the present apparatus, a general outline of the functional operations thereof will be set forth briefly.

The telegraphic tape 25 is advanced one step, for each punching cycle of the apparatus, for successively presenting the transverse rows of key and character code perforations to the cyclically operable sensing pins 50. Sensing contacts 52, controlled by pins 50, are operated in different code combinations in accordance with the information sensed on the tape. The sensing contacts are connected to different translating relays of the group R3—R11 (see Fig. 14A), which relays selectively control the operations of the groups of translating relay contacts (Figs. 14B and 14C) connected in a fan or cascade arrangement. Selective operations of different code groups of the connected translating relay contacts control the selections of individual distributing relays of the group R12—R42. The distributing relay contacts (see the "b" and "c" contacts, Figs. 14D and 14E) are connected, in a predetermined arrangement, to the individual conductors of the group 208—219, which conductors, in turn, are connected to the so-called duplicating magnets 115 of the card punch unit. The said translating and distributing relays, and their associated contacts, are effective to translate or convert the data designations sensed in the five-unit telegraphic code to the statistical code, and accordingly control selectively the energization of the said duplicating magnets, thereby causing the code designating perforation representing the sensed data to be punched in the statistical record cards.

In order to distinguish properly, whether the sensed code designations in the telegraphic tape belong to the alphabetical or numerical group, supervisory circuits are provided which are under control of the sensing contacts 52, and are selectively and automatically conditioned upon sensing the "letters" or "figures" key code designations preceding the relater character code designations. The "figures" relays R43—R46 (Fig. 14D) are included in the said supervisory circuits, the contacts of which are effective to condition the circuits connected to the distributing relay contacts, in such a manner, that the duplicating magnets 115 are controlled to perforate the record cards in the numerical or alphabetical statistical code designations in accordance with the subsequently analyzed telegraphic character designations. It is to be understood, in the instant case, that whenever two rows of code groups of perforations on the telegraphic tape relate to the same group of characters, namely, the numerical or alphabetical group, a single key signal preceding a group of successive code designations representing characters of the same group is sufficient. Accordingly, the translating circuits are conditioned, under the influence of the "figures" or "letters" key code designations, and are maintained in this condition so long as the subsequently analyzed character designations belong to the same character group. Upon sensing a change in the key code, correspondingly appropriate conditioning of the translating circuits is effected and maintained accordingly. In addition thereto, the translating circuits are arranged and controlled so that the sensed key code designations per se are not capable of effecting energization of the duplicating magnets, or advancing the card carriage from one column position to another.

The punch unit is provided with a read-out device 165 (see Figs. 9 and 14F) for automatically controlling the starting and stopping operations of the tape sensing unit. Relay control means, such as relays R47, R48, R53 and R54 (Fig. 14F) are associated with the said read-out device, and automatically cause the sensing operations to be suspended, during predetermined functional operations of the punch unit, such as card ejection and carriage return operations, tabulating and duplicating operations, and thereafter, upon completion of such operations, automatically cause the sensing operations to be renewed. Relay control means, such as relays R49—R52, are also provided and cooperate with certain of the said distributing relays and read-out device for utilizing the "carriage return" and "line feed" signals sensed on the telegraphic tape for determining and checking whether all the functional operations of the sensing and punching units were completed in unison, upon the completion of each cycle of operation of the punch unit. A punch unit or card cycle, in the instant case, refers to the period of operation of the punch unit, whereby a blank card is fed from the hopper to the different columnar positions to receive all the data designating perforations, and then positioned to the last column ready for ejection purposes.

Telegraphic control tape

Referring now to Fig. 7, a tape 25 is shown provided with successive transverse rows of perforations 27 arranged in accordance with the well-known five-unit telegraphic code, usually referred to as the Baudot or Teletype permutative code. In a five-unit code system only thirty two possible permutations are available, and, as mentioned hereinabove, for this reason, it is necessary to employ the same code combinations to represent the alphabetical characters, and the numerical and other designation characters.

In order to distinguish the alphabetical characters from the other remaining characters, for telegraphic transmission purposes, the alphabetical signals or code designations are always preceded by a "letter shift" signal or code designation, and the other remaining character signals or code designations are preceded by a "figure shift" signal or code designation. Whenever, it is desired, in the telegraphic printed copies, to have spaces appear thereon, it is necessary to insert "space" code designations in the perforated tape. For example, in the perforated tape shown in Fig. 7A, the indicated code perforations are arranged so as to designate 123John Jones 567; which arrangement of code designations in the perforated tape is necessary when the tape is employed for controlling the known types of printing telegraph apparatus. The usual smaller feed perforations 26 are also shown to be provided in the tape 25, as well as the "carriage return" and "line feed" perforations which are provided at the end of each line of information.

Tape sensing unit

Figure 2:
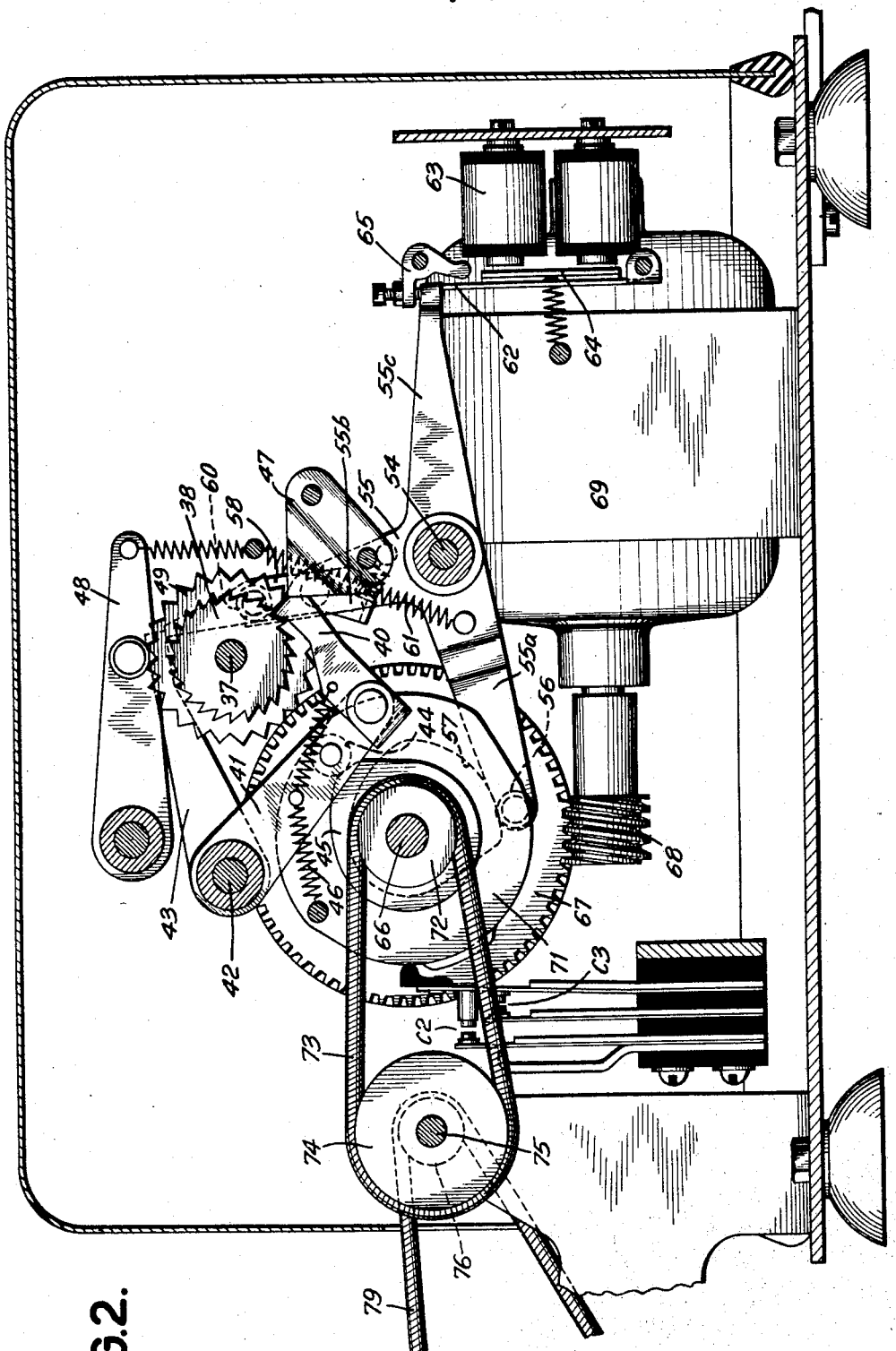
Fig. 2 is a sectional view taken along lines 2—2 of Fig. 1.
Figure 3:
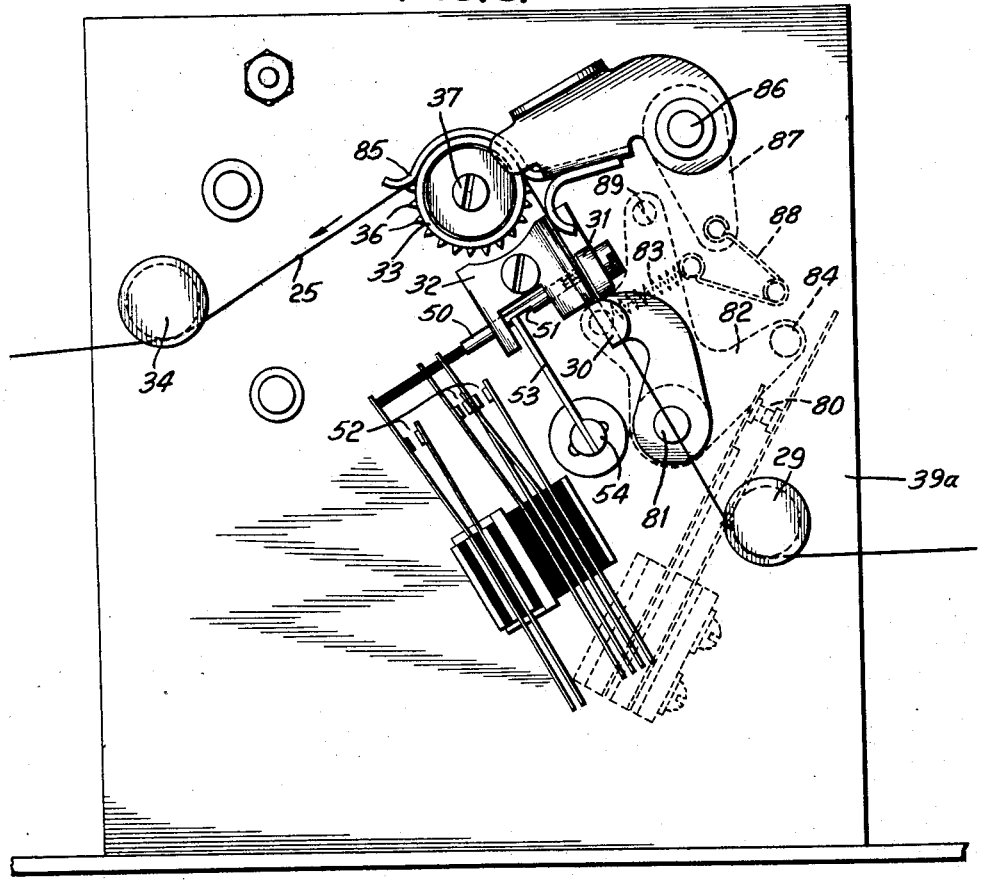
Fig. 3 is a front elevational view of the tape sensing elements.

Referring now to Figs. 1 and 3, the telegraphic tape 25, provided with the said feed perforations 26 and combinational code perforations 27, is fed from a supply roll 28 under a guide post 29, over a tape guide arm 30, between a pair of separated blocks 31 and 32, over a sprocket wheel 33, and under a guide post 34 to a take-up reel 35. Sprocket wheel 33 is provided with the usual centrally located periphery teeth 36 for engaging the feed perforations 26 and feeding the tape in the direction shown by the arrow in Fig. 3. The said sprocket wheel is mounted on a shaft 37, suitably supported by side plate 39a and intermediate plate 39b, to which shaft ratchet wheel 38 is secured. Ratchet wheel 38 is rotated, step by step, by a spring urged pawl 40 (Fig. 2) pivotally mounted on a cam follower arm 41, the latter being secured to shaft 42 (supported by the said side and intermediate plates). Also secured to shaft 42 is a latch arm 43, which when released permits a cam roller 44, carried by the cam follower arm 41, to ride on the periphery of a constantly rotated cam 45, and follow the contour of the latter. The contour of cam 45 is designed so that, upon release of the latch arm, the cam follower arm 41 and pawl 40, during rotation of the cam, are partially rotated in a clockwise direction, by means of spring 46, thereby causing the pawl to ride over a tooth of the ratchet wheel and be in a position for advancing the ratchet wheel, one step, when the high point of the cam urges the cam follower arm and pawl in a counterclockwise direction. A fixed plate 47 secured to side plate 39a is provided with a camming surface which is engaged by the free end of pawl 40, as the latter is urged in a counterclockwise direction, thus, insuring a positive driving connection between the pawl and ratchet wheel, and, also preventing an overdrive of the ratchet wheel. The usual spring urged detent arm 48 is provided, and cooperates with a detent wheel 49 fixed to shaft 37 for maintaining the said shaft 37, ratchet wheel 38, and sprocket wheel 33 in the advanced position.

By this described mechanism, the tape 25 is advanced one step, for each cycle of operation of the machine for presenting the next transverse row of code perforations to the sensing elements. A single sensing element, such as sensing pin 50 (Fig. 3), having a shouldered recess 51, is provided for each unit of the code. The individual sensing pins are suitably disposed in individual openings formed in an U-shaped guide block 32, and are arranged to cooperate with individual sets of suitably disposed contact means 52. In the instant disclosure, five sets of contacts are provided, each set having an elongated spring blade which is engaged by an insulated end of the related sensing pin. With the sensing pins in retracted positions, as shown in Fig. 3, the said spring blades are urged sufficiently, to the left, to open the contacts 52.

Common to the said recesses of the sensing pin is a positionable vane or bail 53 secured to shaft 54. Shaft 54 is suitably journaled in side plate 39a and has secured thereto an inverted T or three armed lever 55, the left arm 55a of which, as viewed in Fig. 2, is provided with a cam roller 56 adapted to cooperate with a constantly rotated cam 57. The upright arm 55b of the said inverted T lever, carries a pivoted latch lever 58 which is urged, in a counterclockwise direction, by spring 59 so that the stop 60, fixed to the said latch lever, normally engages the upper extremity of the said upright arm of lever 55 (also see Figs. 4 and 5). The extremity of the right arm 55c of lever 55, as viewed in Fig. 2, normally is urged, by spring 61, against the top edge of latch plate 62 secured to the released armature 64 of latch magnet 63, thus latching the said inverted T lever in the normal position shown in Fig. 2. Normally, the latch arm 43 is held in a raised or latched position as shown, by means of the pivoted latch lever 58, thereby maintaining the tape feed pawl 40 in its uppermost or end-of-the-stroke position, as indicated in Fig. 2. With the inverted T lever in the described normal position, the constantly cyclic operations of cams 45 and 57 exercise no controlling effects on the related cam follower arms 41 and 55a, respectively. Also, in the said normal position of the inverted T lever, the bail 53 is moved to its extreme position to the left, as viewed in Fig. 3, against the lower shoulders of recesses 51 of the sensing pins 50, thus, holding the latter in their retracted positions, and maintaining the associated contacts 52 in normally open positions.

Upon momentary energization of latch magnet 63, its armature is attracted and the latch plate 62 is withdrawn from the arm 55c, so that the said lever 55 is unlatched or released, and, under the influence of spring 61, the latter is urged in a clockwise direction (see Fig. 4), causing (1) release of latch arm 43, due to withdrawal of latch lever 58 on arm 55b, (2) release of arm 55a and thereby permitting full or effective cooperation between cam 57 and cam roller 56, and (3) release of the sensing pins 50, due to the partial clockwise rotation of bail 53.

Upon release of latch arm 43, cam follower arm 41, during a cyclic operation of cam 45, is partially rotated, first, in a clockwise direction, and then, in a counterclockwise direction to advance the ratchet wheel 38, shaft 37, and sprocket wheel 33, by means of pawl 40, thereby advancing the tape, one step, and presenting the next transverse row of code perforations to the sensing pins.

Upon release of the sensing pins 50, the code perforations are detected or sensed, by the spring urged pins permitted to pass through the perforations and extend into suitable slots or openings formed in the block 31. The travel of the code groups of pins sensing the perforations is sufficient to permit the related contacts 52 to be closed. In this manner, code groups of impulses can be initiated in the individual signaling or control circuits connected to the said sets of contacts 52 for suitable controlling purposes.

During a cyclic operation of cam 57, the lever 55 is first partially rotated in a clockwise direction, and then in a counterclockwise direction. When the highest portion of cam 57 is effective, the lever 55 is urged in a counterclockwise direction sufficiently to raise the arm 55c above the released latch plate 62, as shown in Fig. 5, thereby latching the lever 55 in the normal position. Also, during the cyclic operation of cam 57, and upon the partial counterclockwise rotation of lever 55 and shaft 54, the bail 53 is restored to its normal position, during which restoring operation, the shouldered recesses of the displaced sensing pins 50 are engaged and withdrawn from the perforations in the tape to restore the said pins and associated contacts to their normal positions. The said sensing pins and contacts are locked in this normal position so long as lever 55 is maintained in the described latched position.

Obviously, the described tape feeding operation must be suppressed until the actual sensing of the code perforations and withdrawal of the sensing pins from the tape are completed. In the instant case, it is preferred to prevent tape feeding until the sensing pins are latched in their normal positions. Accordingly, the cams 45 and 57 are arranged so that the high point of the latter is effective to latch the lever 55, before the high point of the former is effective to cause actuation of the tape feeding pawl 40 (see timing chart Fig. 6). For this reason, the latch lever 58 is arranged to be pivotally disposed on arm 55b. After the lever 55 is restored to normal, as shown in Fig. 5, and before the high point of cam 45 is effective to raise the latch arm 43 to its latched position, the pivoted latch lever 58 abuts the end of latch arm 43, and is only restored into latching position by spring 59, when the latch arm 43 is raised over the said lever 58. In this manner, tape feed operations are effected after the sensing pins are retracted from the tape, and latched in the said retracted positions. It should also be mentioned that a suitably pivoted restoring lever 65 is provided for positively moving the latch plate 62 to its normal position, when the arm 55c is raised.

Now, with reference to Figs. 1 and 2, it is seen, that cams 45 and 57 are secured to and driven by shaft 66 to which worm gear 67 is affixed, said gear being in mesh with a worm 68 constantly rotated by motor 69. Thus, the cams are operated continuously for controlling the sensing and tape feed operations, at such times when the control magnet 63 is energized. Also, if desired for various circuit controlling purposes, cams 70 and 71 are shown secured to shaft 66 for controlling the operations of the suitably disposed and related contacts C1, and C2, C3 respectively. In addition thereto, a suitable frictional drive may be provided for the take-up reel 35, by providing a driving pulley 72 on shaft 66, which pulley is connected by a spring belt 73 to intermediate pulley 74, the latter being secured to stud shaft 75 carrying pulley 76, which in turn is connected to pulley 77 mounted on the take-up reel shaft 78 by spring belt 79.

Referring to Fig. 3, additional circuit controlling means can be provided in the form of contacts 80, which are arranged to be opened, upon exhaustion of the tape supply to the sensing pins 50. The tape guide arm is secured to shaft 81 journaled in the side plate 39a, which shaft also carries bell crank lever 82. By means of spring 83, the said bell crank and tape guide arm are normally urged in a clockwise direction so that an insulating pin 84, secured to lever 82, opens contacts 80. This motion, however, is prevented when the supply of tape from roll 28 is not exhausted, due to the tape riding over the guide arm 30 and causing the said guide arm and pin 84 to be held in the positions shown in Fig. 3. An arcuately shaped and slotted tape guide member 85 is also provided to press the tape against the sprocket wheel 33, which member is secured to stud shaft 86 journaled in side plate 39a. Also secured to stud shaft 86 is a depending arm 87 arranged to engage the suitably disposed toggle spring 88. The said arm 87 is capable of engaging a pin 89 (secured to lever 82), whenever the guide member 85 is raised manually (for example, during insertion of a new tape), to rotate the bell crank lever 82 and tape guide arm 30 in a counterclockwise direction, thus facilitating tape removal or insertion operations.

In order to insure proper synchronous operations of the described elements, it is preferred to include the cam controlled contacts C1 in the circuit connected to the control magnet 63. In this manner, irrespective of the times the control impulses are impressed upon the circuit including magnet 63, the latter is not energized to release the said lever 55 until a predetermined time during each cyclic rotation of cams 45 and 57, as indicated in the timing chart in Fig. 6. Thus, it is seen, by this provision, that the operated elements are influenced and actuated in the described sequences.

This tape sensing or transmitter unit employed herein is shown and described, and claimed in copending application of Mills and Furman, Serial No. 449,446, filed July 2, 1942.

Record card

With reference now to Fig. 8, the sheet to be perforated is shown to comprise a well known tabulating machine record card, generally designated C, of the type quite commonly used in the Hollerith electric tabulating systems. Differentially positioned control representations, such as perforations 90, are used to represent the various data and character designations. The perforations are differentially positioned in various columnar areas or fields of the record card, and by the differential positioning thereof different data values are imparted thereto. It is seen, that the letters of the alphabet are designated by pairs of control representations or perforations, each perforation of a pair being located in one of the twelve index point positions of a columnar area. Commonly, the index point positions indicated as "R" and "X" are referred to, in the tabulating systems, as the "twelve" and "eleven" index point positions, respectively.

The Hollerith character code shown in Fig. 8 is quite an arbitrary one and different well known codes which have been used in statistical systems may be employed in the present recording system. It will be noted, by reference to the said code in Fig. 8, that the alphabet is divided into three groups. The letters of the first group A to I are designated by different combinations of a perforation in the "R" index point position with perforations in the one to nine index point positions. The letters of the second group J to R are designated by perforations in the "X" position and combination of perforations in the one to nine positions, while the letters of the third group S to Z are identified by combinations of a "O" perforation with perforations in the two to nine index point positions. The individual numerical characters are represented by a single perforation in the corresponding zero to nine index point positions. The record cards may have as many columnar areas for the reception of the data designating perforations as may be desired. The description to be set forth hereinbelow related to mechanism commonly used in tabulating systems employing the standard eighty column record card.

Record perforating unit

Referring now to Figs. 9–13, the controlled card punch unit will be described. As mentioned hereinabove, the tape sensing unit is electrically connected with the said punch unit to effect puncning of record cards, in predetermined columns, in accordance with the data sensed on the telegraphic tape. The punch unit is well known in the art, and is usually referred to as "The International duplicating punch." The following brief and general description is believed sufficient in order to fully comprehend its use in the present invention; however, if a more detailed and complete description of the punch unit per se is desired, reference should be made to U. S. Patent No. 1,976,618, and to the punch at the top of Fig. 1 of U. S. Patent No. 2,016,686.

During the operation of the said punch unit, a blank statistical card C is fed from the bottom of the hopper 111 by the usual picker knife 112, and is advanced to the left, as viewed in Fig. 9, to a position where the said card is received by the positionable card carriage 113. The card is then punched, column by column, as desired, and the card carriage moves, step by step, to the left. When the punching of the card is completed, and the card carriage has reached the end of its movement, the punched card is automatically removed, and the operation just set forth can be repeated.

The said punch unit can be controlled manually, by depression of the data keys 114, or automatically, under control of the magnets 115, referred to in the art as duplicating selector magnets. The individual armatures 116 (Fig. 10) of the magnets 115 are connected to the related keys 114 by individual pivoted links 117, so that, upon energization of the said magnets, the corresponding data keys 114 are caused to be depressed. Depression of a key 114 actuates an associated bell crank 118 which, in turn, effects positioning of a related interposer 119 to the left, as viewed in Fig. 10. Whenever an interposer 119 is thus positioned, it can be acted upon by a depending member 120 of a depressor plate 121. Upon positioning an interposer 119, to the left, a common bail 122 is rocked, raising an arm 123, thereby causing contacts PC to be closed.

Closure of the said PC contacts causes energization of the punch magnet 124, whereupon, the armature 125 (Fig. 11) is swung about its pivot, rocking bell crank 126, through the link 127, and drawing downwardly the link 128, thereby causing the depressor plate 121 to be rocked. Upon rocking of the said depressor plate, the positioned interposer 119 is depressed, consequently, causing the corresponding punch 130 to be depressed to perforate the card in a corresponding index point position. As the punch passes through the card, and the link 127 moves to the right, the lug 131 pushes the arm 123 to the right (as viewed in Fig. 11) to release and open the said contacts PC, thereby causing the said punch magnet 124 to be deenergized, and permitting the punch and its actuating mechanism to return to the shown normal position.

Figure 12:
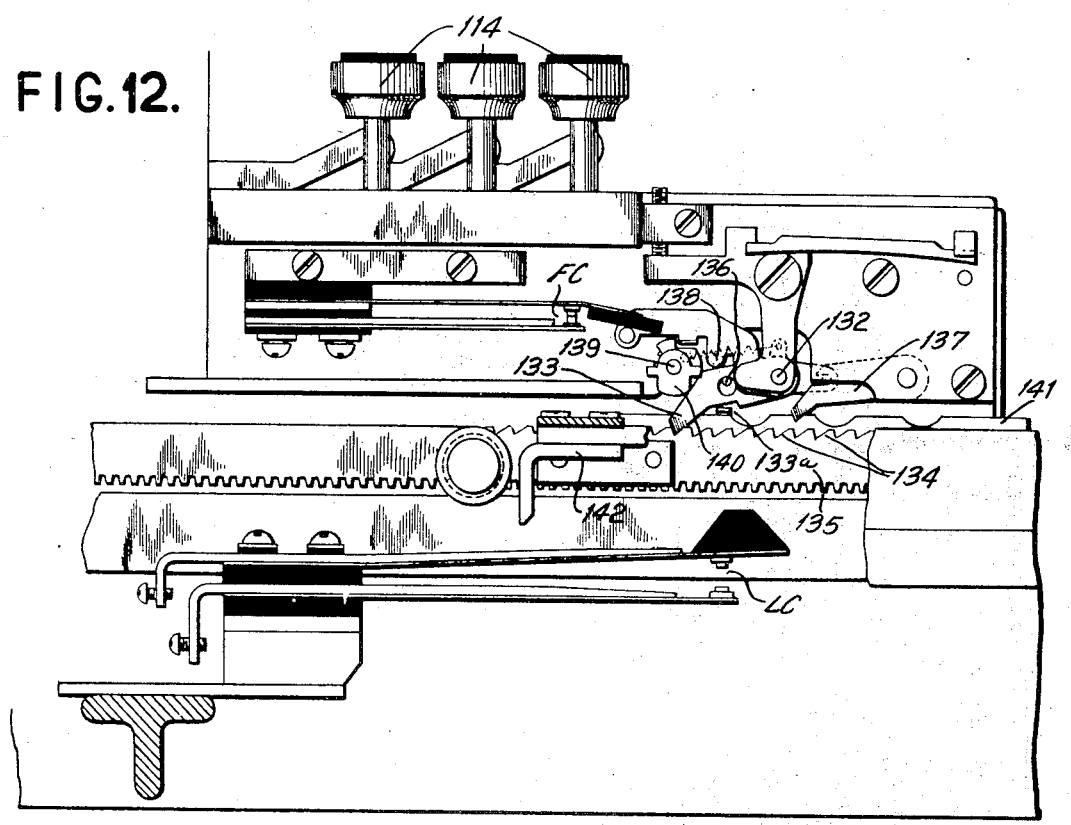
Fig. 12 is an enlarged view illustrating the details of the carriage escapement mechanism of the perforating unit.
Figure 13:
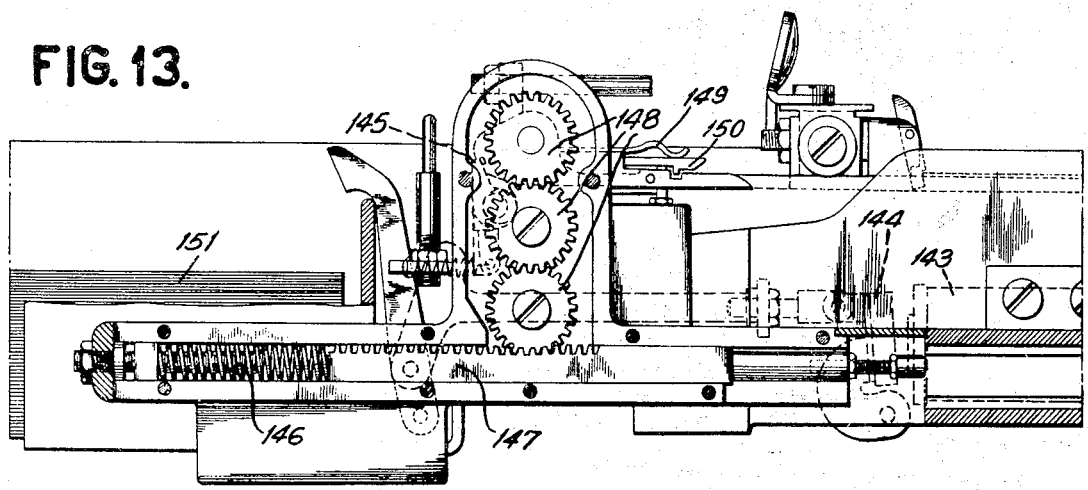
Fig. 13 is a view, in side elevation, of the ejecting mechanism of the perforating unit.
Figure 14A:
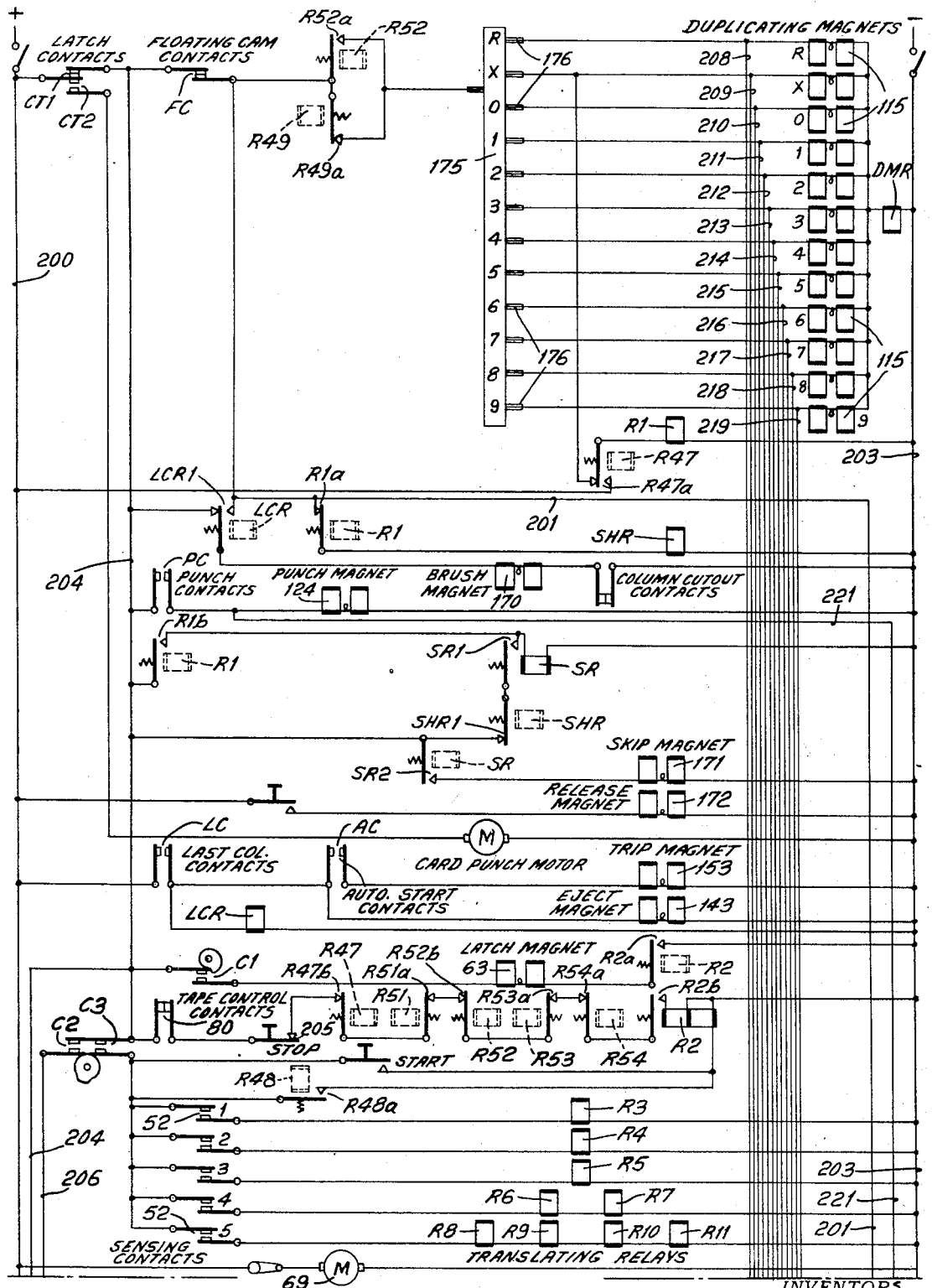
Figure 14B:
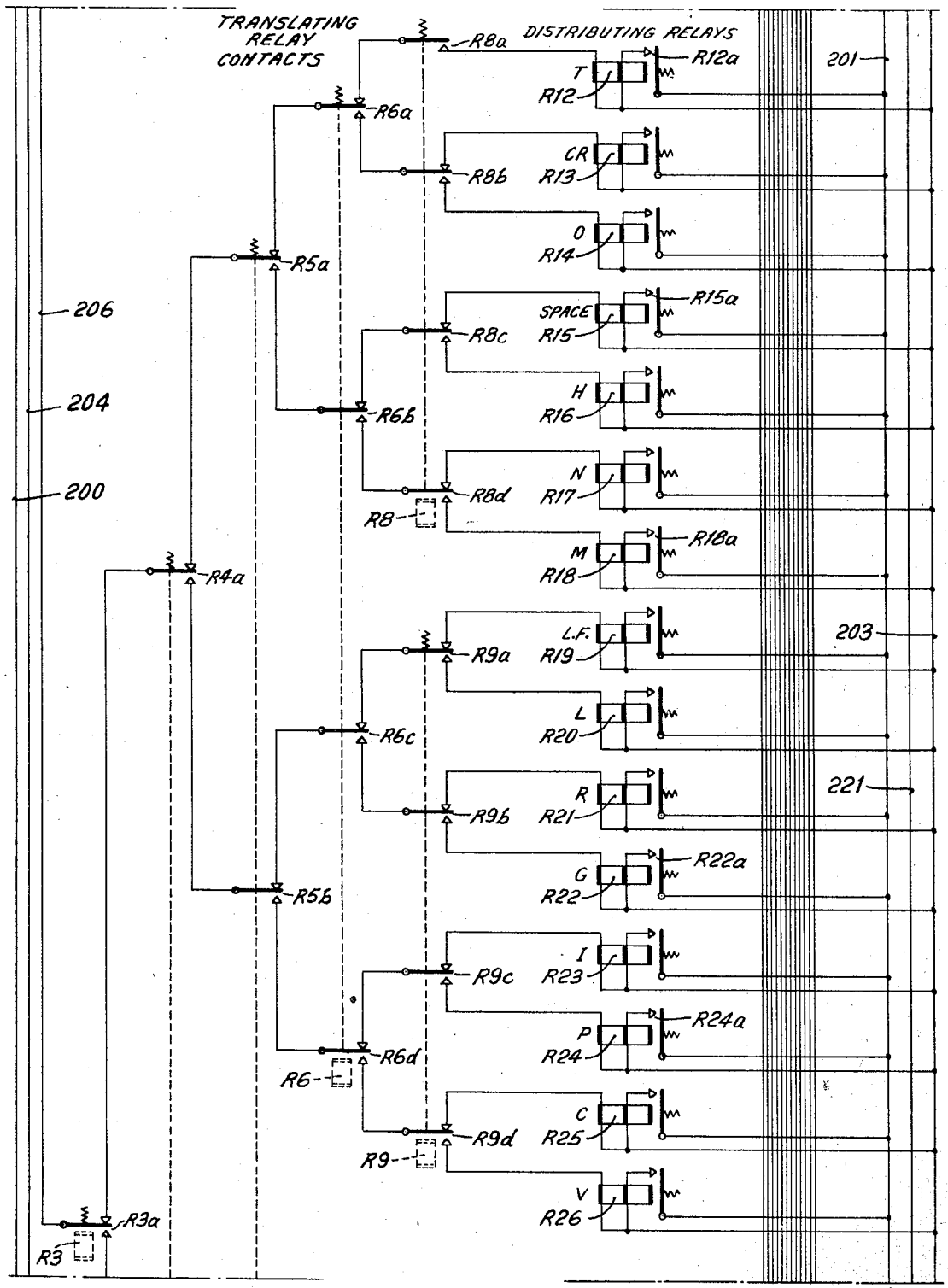
Figure 14C:
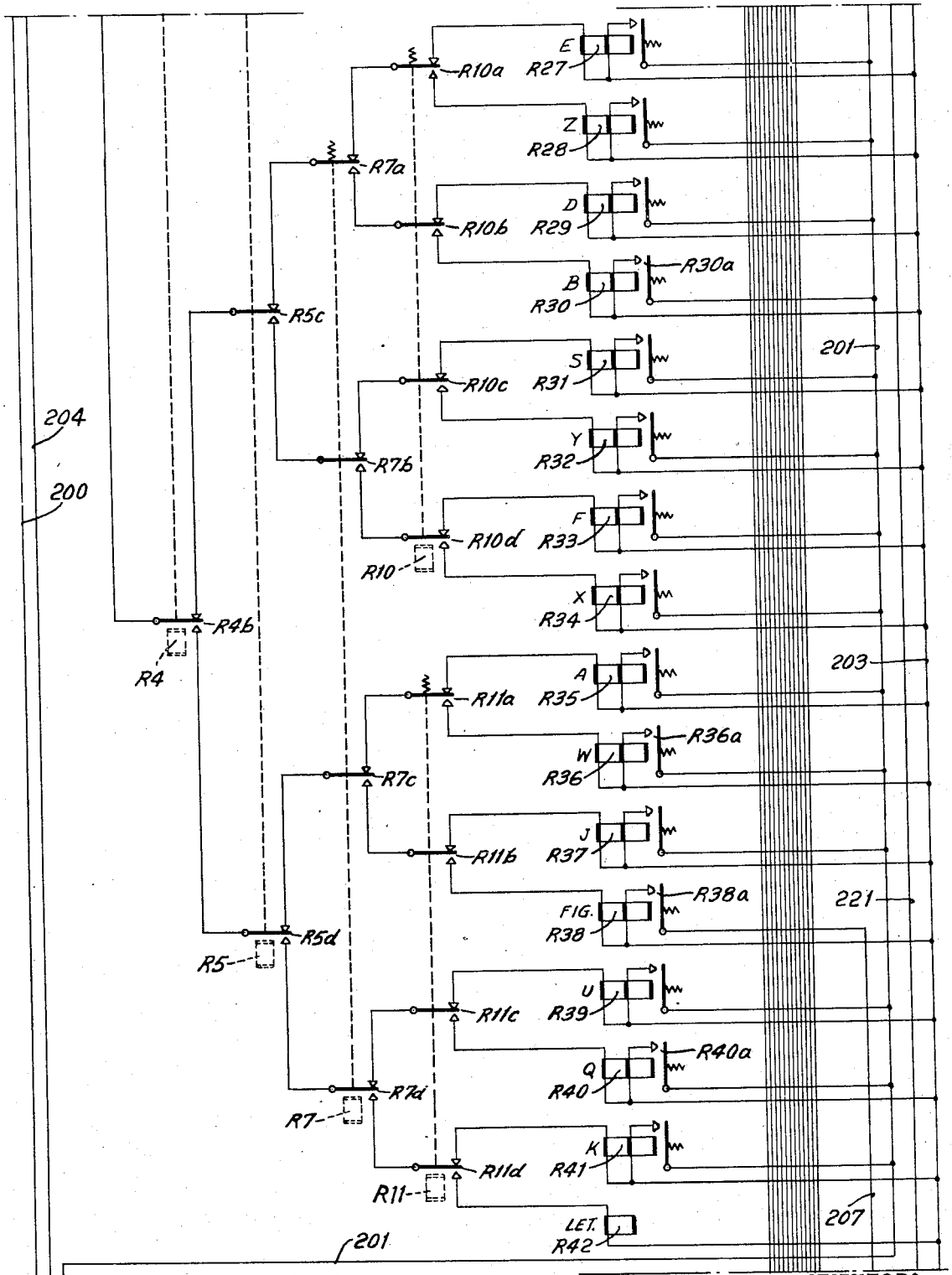
Figure 14D:
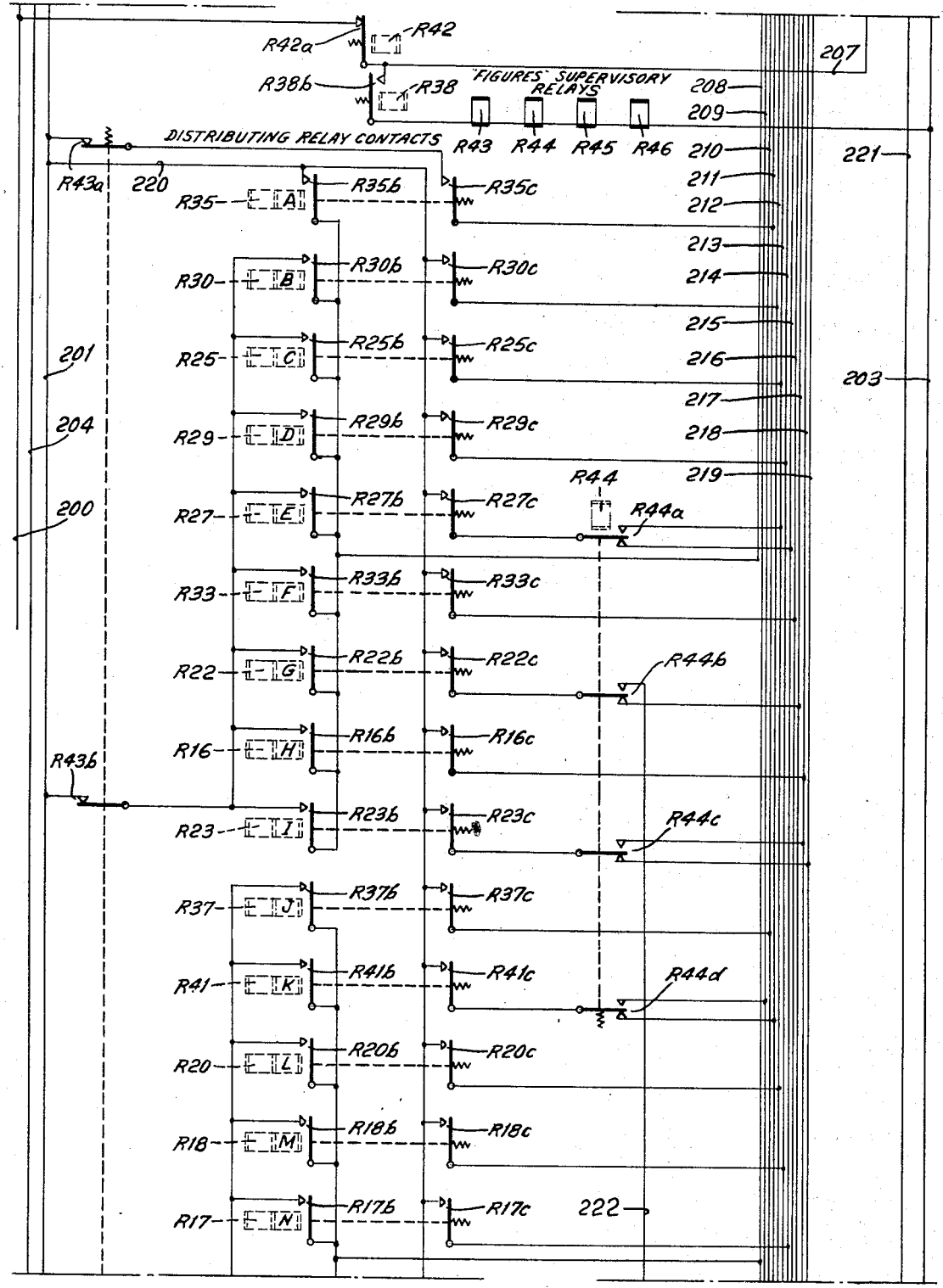
Figure 14E:
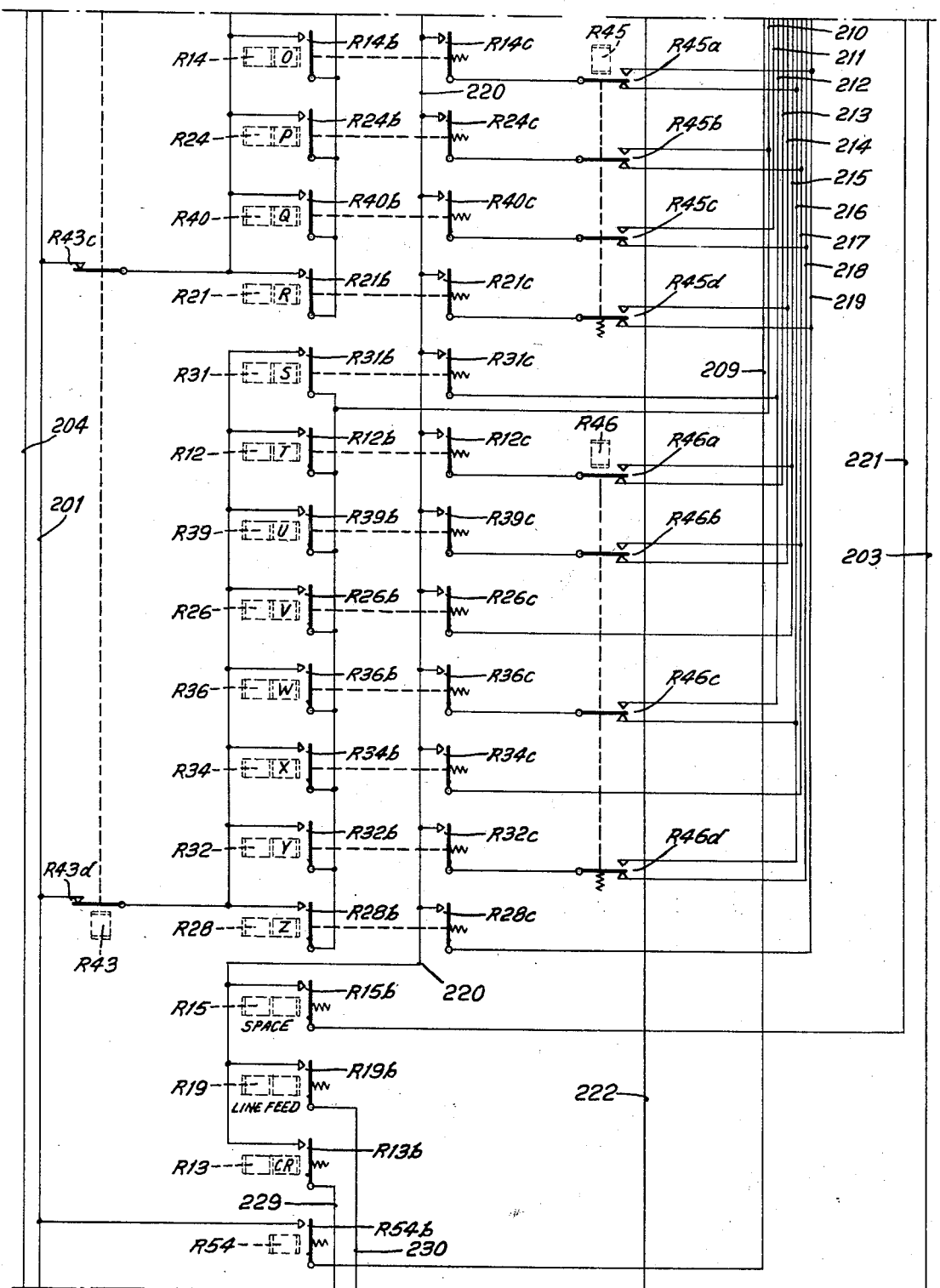
Figure 14F:
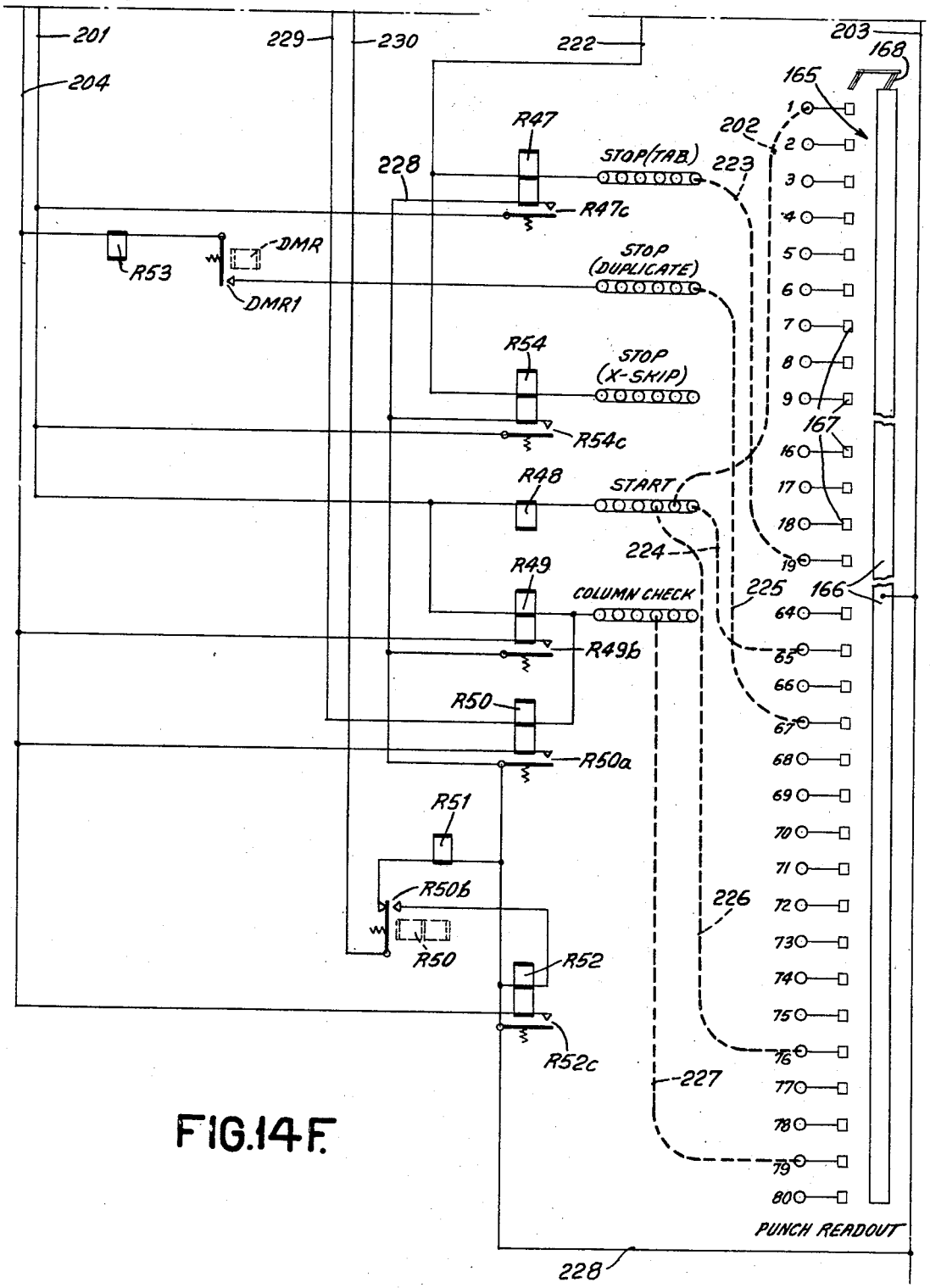

With each punching operation, the well known escapement mechanism, shown in Fig. 12, is operated to permit the card carriage 113 to be released one step, in order to present the next adjacent column of the card to the punches. Thus, for each punching operation, shaft 132 is rocked in a clockwise direction and then a counterclockwise direction, to first effect disengagement of pawl 133 from teeth 134, formed on the top side of the card carriage rack 135, by a shaft actuated pin 136, and the engagement of latch pawl 137 with teeth 134. Spring 138 will then pull pawl 133, to the left, on its loose pivot, to rest on top of a tooth, so that, when the counterclockwise movement of the shaft 132 raises pawl 137, the advance of the rack 135 and card carriage 113 will be halted, by pawl 133 engaging the next tooth.

The rocking of the common bail 122 also causes the shaft 139, affixed thereto, to be rocked, as well as the T shaped element 140, consequently, opening the well known floating cam contacts FC, each time the card carriage is advanced. The usual skip bar 141 can be provided, for cooperation with the pawl 133 through the agency of the usual skip lifter arm 133a to permit an extended movement of the card carriage, until the next low spot in the skip bar allows the said pawl to be lowered.

Thus, it is seen, that the punches 130 can be operated selectively, under control of the duplicating magnets 115, to effect punching of the desired data in the card 110, in adjacent columns, step by step, or, to automatically skip predetermined columns of the card, under control of the skip bar 141, and effect punching only in certain predetermined columns. The usual skip magnet 171 and release magnet 172 (Fig. 14A) are provided for controlling the action of the said lifter arm 133a so that multiple column advancement of the card, and complete release of the card from any position to the last column position, respectively, can be effected upon energization of the said magnets.

The said card carriage 113 is provided with extensions 173 and 174 between which a pattern or master card M can be positioned and moved back and forth with the card carriage. Positioned above the pattern card is a contact roller 175 (see Fig. 14A) which is insulated from the frame of the machine. Directly below the roller is a row of positionable sensing brushes 176. The usual brush magnet 170 is provided, which upon energization causes an upward movement of brushes 176 into engagement with the pattern card.

Upon extension 174 is mounted a brush carrier, of a punch read-out device 165, provided with electrically connected brushes 168 (see Figs. 9 and 14F), one of the said brushes cooperating with a common conducting strip 166, and the other of said brushes cooperating with the equally spaced conducting segments 167. As is well known, the brushes 168 connect successively the conducting segments 167 to the common conducting strip 166, as the card carriage moves along step by step.

As mentioned before, provision is also made, for automatically ejecting the punched card, after the card is positioned to the last column position, and returning the card carriage to pick up another card, from the picker, for subsequent punching operations. After the positioning of the last column of the card to the punching position, the last column contacts LC are closed, by means of bracket 142 secured to rack 135. It will be explained later, how the closure of contacts LC effects energization of the ejector magnet 143. Upon energization of magnet 143, the associated armature 144 is partially rotated, in a clockwise direction, to actuate the associated mechanism to release latch 145. This permits spring 146 to move rack 147 to the right, as viewed in Fig. 13, and gears 148 to actuate the gripper jaws 149 and 150, thereby raising the card just punched, and depositing it upon the stack 151. Return of the said jaws is accomplished, by movement of the rack 147, to the left, by the end of rack 152 (Fig. 11), during the return of the card carriage, which will be described presently. It should be mentioned, at this time, that suitably disposed auto-start control contacts AC (see Fig. 14A) are provided, so that these contacts are closed by the rack 147, when the latter is positioned to the right, as viewed in Fig. 13 (these contacts are designated 201 in the said Patent No. 1,976,618).

Figure 11:
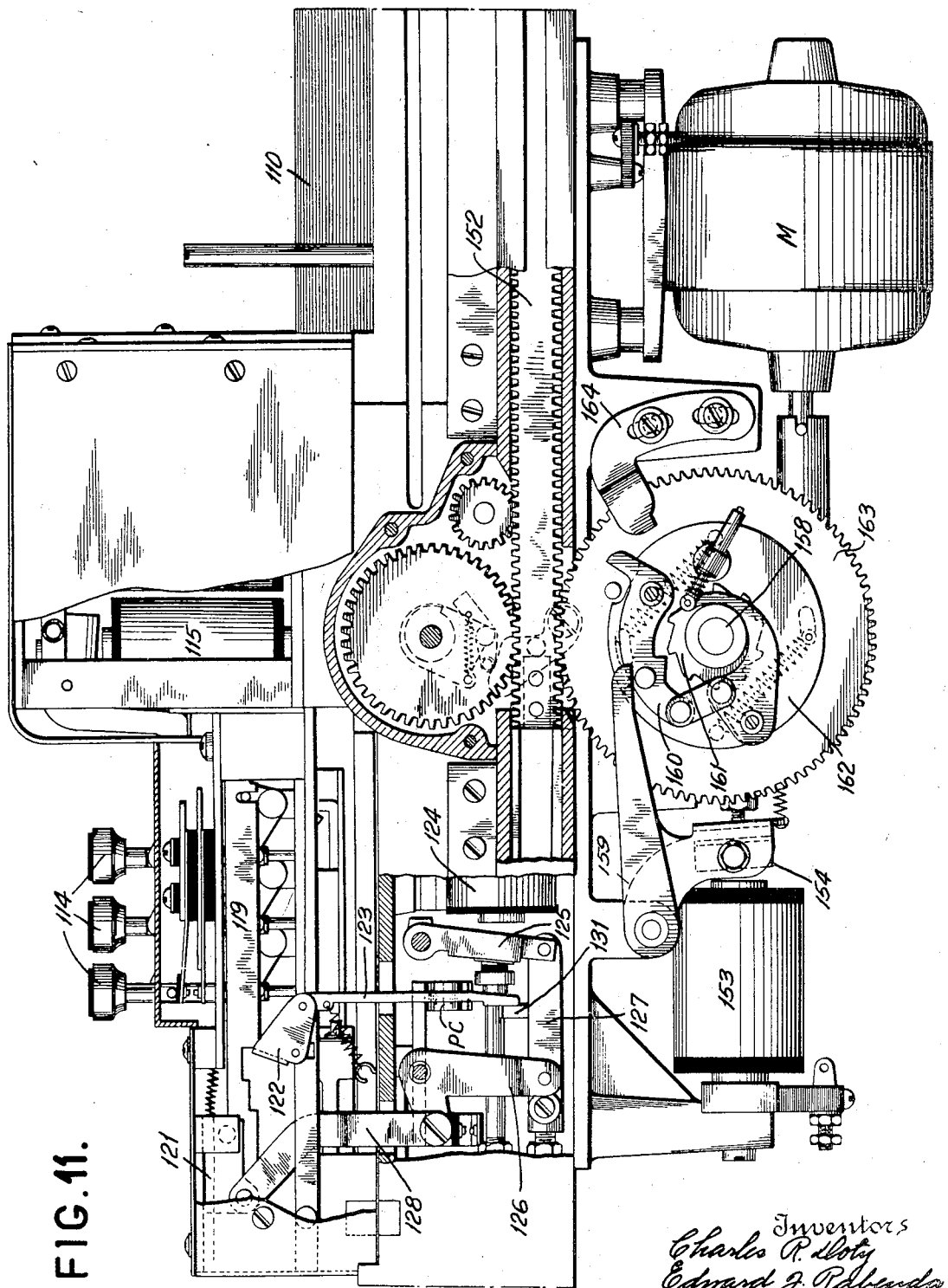
Fig. 11 is a sectional view, similar to Fig. 10, but taken on a section line further to the front of the perforating unit.

It will be shown later, that closure of contacts AC causes the clutch trip magnet 153 to be energized. Referring now to Figs. 10 and 11, upon energization of the said magnet 153, armature 154 is partially rotated, in a clockwise direction, to cause the attached arm 155 to depress block 156 under the shoulder of latch 157, thereby causing the latch contacts CT1 to be held open, and contacts CT2 closed. It will be shown, that closure of contacts CT2, causes the carriage return motor M to be energized, the latter, in turn, causing the shaft 158 to be rotated.

Another arm 159, attached to said armature 154, is depressed to cause the pawl 160 to engage one of the teeth of ratchet 161, the latter being secured to shaft 158. The pawl 160 is pivotally carried by disk 162, which disk, in turn, is secured to gear 163, so that gear 163 is set into rotation, whenever the clutch mechanism is tripped, as described. Since gear 163 is in engagement with the lower set of teeth of rack 152, the said rack 152 and card carriage 113 are returned to the right, as viewed in Fig. 1, upon rotation of gear 163, to receive another card from the said picker 112.

A fixed camming bracket 164 is provided to engage the free end of pawl 160, during its rotation, thereby disengaging the said pawl and ratchet, upon one revolution of shaft 156. Provision is also made to release the latch 157, at this time, to restore the said contacts CT1 and CT2 to the normal positions shown in Figs. 10 and 14.

Operation

Referring now to Figs. 14A to 14F, arranged sequentially one below the other, the operation of the described units will be explained in connection with the circuit diagram.

Assume that the telegraphic tape 25 is properly inserted in the sensing unit, and that a statistical card C is positioned in the first column position in the card punch unit; also, assume that the first part of the message perforated in the tape is 123John Jones 567, and that the apparatus is suitably plugged by connector 202, from the "1" column position of the punch readout device 165 to the "start" plug socket (see Fig. 14F), so that sensing operations are started automatically for perforating the card, in statistical code, in accordance with the sensed data formed in telegraphic code in the tape, upon presentation of the first column position of the card to the punching station.

Under the mentioned conditions, and upon closure of the floating cam contacts FC, a circuit is established from conductor 200, connected to one terminal of the power supply, through the normally closed latch contacts CT1, said cam contacts FC, conductor 201, coil of relay R48 (Fig. 14F), plug connector 202, the column "1" conducting segment 167, brushes 168, and common conducting strip 166 to conductor 203, connected to the other terminal of the power supply, thus causing the said relay to be energized.

Upon closure of the cyclically operated cam contacts C3 (see Fig. 6), a circuit is completed from conductor 200 to contacts CT1, conductor 204, said cam contacts C3, contacts R48a (Fig. 14A) now closed, pick-up coil of relay R2 to conductor 203, causing relay R2 to be energized. A holding circuit for this relay is immediately established from conductor 200 to contacts CT1, conductor 204, normally closed contacts 80, contacts 205 of the stop key, normally closed contacts R47b, R51a, R52b, R53a and R54a, contacts R2b now closed, the holding coil of relay R2 to conductor 203. This holding circuit is maintained continuously until one of the mentioned normally closed contacts included therein is opened.

At the end of each cycle of operation of the sensing unit, cam contacts C1 are closed, and with contacts R2a closed, a circuit is completed to the latch magnet 63 from conductor 200 to contacts CT1, conductor 204, cam contacts C1, latch magnet 63 and contacts R2a to conductor 203, thus energizing the said magnet and rendering the sensing elements 50 operative. It is to be noted, that the said cam contacts are opened and closed, during each cycle, to effect a momentary energization of the latch magnet 63. The timing of the sensing unit is arranged, in the instant case, so that a cycle of operation thereof is not completed before the card punch operations for each column are completed.

Figure 6:
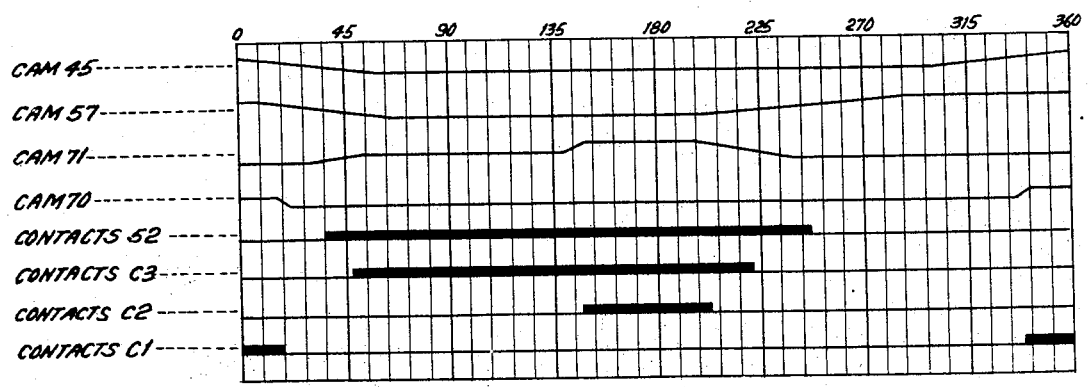
Fig. 6 is a timing chart of cyclically operable elements of the sensing unit.

*Numerical data.*—It was assumed, that the first three characters of the data recorded on the tape belong to the numerical group, and accordingly, as shown in Fig. 7A, these data designations are preceded by a common key code "figures" designation. During the first operation of the sensing elements, and upon sensing the said "figures" code designations, the "1," "2," "4" and "5" contacts 52 are closed. Upon closure of cam contacts C3 circuits are completed, through the said contacts 52, to energize the translating relays R3, R4, R6 and R7, R8, R9, R10 and R11, respectively, as follows: conductor 200, latch contacts CT1, conductor 204, cam contacts C3, the said sensing contacts and translating relays to conductor 203, thus causing the said relays to be energized. Accordingly, the associated translating relay contacts R3a, R4a—R4b, R6a—R6d, R7a—R7d, R8a—R8d, R9a—R9d, R10a—R10d, and R11a—R11d are shifted or transferred to permit the following circuit to be established, upon closure of cam contacts C2 (which cam contacts C2 are closed during the time cam contacts C3 are closed, as indicated in Fig. 6), conductor 200, latch contacts CT1, conductor 204, cam contacts C2, conductor 206, transferred contacts R3a, R4b, normally closed contacts R5d, transferred contacts R7c and R11b to the pick-up coil of the "figures" distributing relay R38 and conductor 203, energizing said relay. A holding circuit is established immediately for this relay from conductor 200 to normally closed contacts R42a (Fig. 14D), conductor 207, contacts R38a to the holding coil of relay 38 and conductor 203. This holding circuit is maintained until the normally closed contacts R42a of the "letters" relay R42 are opened.

Closure of contacts R38b (Fig. 14D) permits a circuit to be established from conductor 200 through said contacts R42a and R38b, coils of the "figures" supervisory relays R43, R44, R45 and R46 to conductor 203, thus energizing the said supervisory relays. Accordingly, contacts R43a—R43d are opened, and contacts R44a—R44d, R45a—R45d, and R46a—R46d are transferred. These mentioned contacts are maintained in the said operated positions until the said "letters" relay is energized. Thus, the group of circuits connected to the distributing relay contacts (see Figs. 14D and 14E) are conditioned under control of the described "figures" supervisory circuit. No circuits are completed through these conditioned circuits, to the group of circuits 208—219 and the connected duplicating magnets 115, at this time, for effecting energization of the said magnets.

However, during the next sensing operation, upon sensing the numerical code designations for the numeral "1," and "1," "2," "3" and "5" sensing contacts 52 are closed to permit relays R3, R4, R5, and R8, R9, R10 and R11, respectively, to be energized, upon closure of the said cam contacts C3, through circuits traced in detail hereinabove. Upon closure of cam contacts C2, the following circuit is completed through the groups of translating relay contacts: conductor 200, latch contacts CT1, conductor 204, cam contacts C2, conductor 206, transferred contacts R3a, R4b, R5d, normally closed contacts R7d, and transferred contacts R11c to the pick-up coil of distributing relay R40 and conductor 203, energizing said relay. A holding circuit is immediately established by this relay from conductor 200 through latch contacts CT1, floating cam contacts FC, conductor 201, contacts R40a and the holding coil of relay R40 to conductor 203. This holding circuit is maintained until the said contacts FC are opened as an incident of each punching operation.

The "b" and "c" contacts of relay R40 (Fig. 14E) are normally effective to control the duplicating magnets so as punch the alphabetical character "Q" in statistical code in the card, however, due to the control exercised by the "figures" supervisory relays over the circuits connected to the distributing relay contacts, the said magnets are controlled to effect the punching of the numerical character "1" in statistical code. The punch magnet circuit established, at this time, can be traced from conductor 200 through latch contacts CT1, floating cam contacts FC, conductor 201, conductor 220, contacts R40c, transferred contacts R45c, conductor 211 to the "1" duplicating magnet 115, coil of relay DMR and conductor 203, energizing said magnet and relay. Relay DMR exercises no controlling effects at this time.

As mentioned hereinabove, upon energization of the said duplicating magnet and positioning of the related interposer, the punch contacts PC are closed to energize the punch magnet 124, whereupon a perforation is formed in the "1" index point position of the first card column, and the next card column is fed to the punching station. During the said feeding operation, the floating cam contacts FC are opened momentarily. Due to the opening of the said cam contacts FC, the holding circuit for relay R40 is broken, thereby restoring this relay and the associated contacts to the described normal condition.

Upon completion of the punching operation, cam contacts C1 are closed to again energize the latch magnet 63 and initiate another sensing operation. The next row of data designations in the telegraphic tape represents the numeral "2," therefore, upon sensing these designations, contacts 52 are effective (upon closure of cam contacts C3) to cause energization of translating relays R3, R4 and R8—R11. Similarly as described hereinabove, the translating relay contacts are effective, upon closure of cam contacts C2, to establish a circuit to the distributing relay R36, and permit a circuit to be completed, through contacts R36c, to conductor 212 and the "2" duplicating magnet 115. Likewise, the "3" duplicating magnet 115 is selected and energized, upon the sensing of the code designations in the tape representing the numeral "3." In view of the detailed description up to this point, it is believed unnecessary to describe further numerical sensing operations.

*Alphabetical data.*—The next data recorded on the telegraphic tape belongs to the alphabetical group, and accordingly is preceded by the "letters" key code designation. Upon sensing the code group of perforations for this key code, and upon closure of cam contacts C3, the translating relays R3—R11 are energized.

Upon closure of cam contacts C2, a circuit is completed from conductor 200 through latch contacts CT1, conductor 204, cam contacts C2, conductor 206, the transferred translating relay contacts R3a, R4b, R5d, R7d, and R11d to the coil of the "letters" relay R42 and conductor 203, energizing said relay. Opening of the contacts R42a breaks the holding circuit to the "figures" relay R38, and consequently causes deenergization of the "figures" supervisory relays R43—R46. Now, upon sensing the code designations for the character "J," the "1," "2" and "4" contacts 52 permit the translating relays R3, R4, R6 and R7 to be energized, upon closure of cam contacts C3. Closure of cam contacts C2 then establishes a circuit through the transferred contacts R3a, R4b, normally closed contacts R5d, transferred contacts R7c, and normally closed contacts R11b to the coil of the "J" distributing relay R37. The related distributing relay contacts R37b and R37c are then closed to establish a circuit from the floating cam contacts FC through conductor 201, contacts R43c, R37b to conductor 209 and the "X" duplicating magnet 115, and by means of contacts R37c another circuit is established to the conductor 211 and "1" duplicating magnet 115, thereby causing perforations to be formed in the "X" and "1" index point positions for representing, in statistical code, the character "J." It is to be noted, that the circuits controlled by the distributing relay contacts remained conditioned as described, that is, contacts R43a—R43d remain closed, and contacts R44a—R44d, R45a—R45d and R46a—R46d remain untransferred, during the subsequent sensing operations, until a subsequent "figures" key code designation is sensed.

Accordingly, during subsequent sensing operations, the sensing contacts 52 are controlled to govern the successive selections of the R14, R16 and R17 distributing relays, which relays, in turn, control the selections of, and operations effected by, the duplicating magnets 115, so that the fifth to seventh card columns are perforated successively in the "X" and "6," "R" and "8," and "X" and "5" index point positions, respectively, for representing, in statistical code, the "O," "H," and "N" alphabetical characters. In view of the detailed description up to this point, it is believed unnecessary to describe further alphabetical sensing operations.

*Space operations.*—In the instant case, it is desired to effect spacing of the card carriage, in the punch unit, each time a "space" designation is sensed in the telegraphic tape. Upon sensing a "space" code designation, the "3" sensing contacts 52 are closed to establish a circuit to the translating relay R5, upon closure of cam contacts C3. Upon closure of cam contacts C2, a circuit is completed from the floating cam contacts FC through the said cam contacts C2, conductor 206, normally closed contacts R3a and R4a, transferred contacts R5a, normally closed contacts R6b and R8c to the "space" distributing relay R15. A holding circuit is established for this relay through contacts R15a, conductor 201 and the cam contacts FC, precisely as traced hereinbefore. The contacts R15b (Fig. 14E) are now effective to connect the said cam contacts FC, by means of conductor 220, to conductor 221 and the punch magnet 124, energizing this magnet and spacing the card carriage one step, to present the next column in the card to the punching station. During operation of the punch escape mechanism, the cam contacts FC are opened to break the described holding circuit to translating relay R15.

It is to be noted, that, during spacing operations in the instant case, the "figures" supervisory control circuits are not disturbed, by this it is meant, that the circuit to the "figures" relays R43—R46 is not deenergized, but maintained energized through contacts R42a and R38b, until a "letters" key code is presented to the sensing station. Thus, it is seen, that, whenever a "space" signal appears between data designations of the numerical or alphabetical group, it is not necessary to repeat the "figures" or "letters" key code after the "space" signal in the telegraphic tape.

If desired, however, that the "space" signal should restore the "figures" and "letters" supervisory circuits to normal, so that the proper key code must appear in the tape preceding the numerical or alphabetical data, irrespective of the disposition of the key code signal, additional control contacts can be provided on the "space" distributing relay R15, which are placed in series with contacts R42a (holding circuit for "figures" distributing relay R38) to open the associated circuit, thus, restoring the "figures" supervisory control circuits to normal each time a "space" signal is sensed in the telegraphic tape.

*Tabulating operations.*—In certain types of telegraphic control operations, it is desired to tabulate over certain portions of the printed sheet or form. At such times, the tabulating signal or designation is punched in the tape as a "figures" "G" signal. Assume, that in the instant case, columns 19 to 64 are to be skipped, when the said tabulate signal is sensed, and it is further assumed, that this signal occurs in the telegraphic tape after the code designations for the numeral "7," as indicated in Fig. 7A. For these conditions, the punch read-out device 165 is plugged from the "19" conducting segment 167 to the "stop" (tab) plug socket. Upon sensing the "figures" key code designation, the "1," "2," "4" and "5" sensing contacts 52 control the selection of the "figures" distributing relay R38, which selection, in turn, causes the "figures" control relays R43—R46 to be energized, as described hereinbefore. Now upon sensing the "G" designation, the "2," "4" and "5" sensing contacts 52 cause the translating relays R4, R6—R11 to be energized, upon closure of cam contacts C3. Upon closure of cam contacts C2, a circuit is completed from latch contacts CT1 through conductor 204, cam contacts C2, conductor 206, normally closed contacts R3a, transferred contacts R4a, normally closed contacts R5b, transferred contacts R6c and R9b to the pick-up coil of the "G" distributing relay R22. A locking circuit for this relay is established through contacts R22a and the floating cam contacts FC, as traced hereinabove. Upon closure of contacts R22c, a circuit is completed from the cam contacts FC through conductors 201 and 220, contacts R22c, transferred contacts R44b, conductor 222, pick-up coil of relay R47, plug connector 223, the "19" conducting segment 167, brushes 168, common conducting strip 166 to conductor 203, energizing said relay. A holding circuit for this relay is established from said conductor 201 through contacts R47c, holding coil of relay R47, and conductors 228 and 203. Contacts R47a are transferred to connect relay R1 to conductors 200 and 203, energizing this relay; and contacts R47b open the holding circuit to relay R2 causing the circuit to latch magnet 63 to be opened, thereby preventing further energizations of this magnet, by cam contacts C1, and further sensing operations, until contacts R47b are closed.

Opening of contacts R1a opens the circuit to the SHR relay (Fig. 14A); and closure of contacts R1b permits a circuit to be established from conductor 200 through latch contacts CT1, conductor 204, said contacts R1b coil of relay SR to conductor 203, energizing said relay. A holding circuit is established for this relay through contacts SR1, SHR1 and the said latch contacts CT1. Closure of contacts SR2 connects the latch contacts CT1 to the skip magnet 171, energizing this magnet, and by means of a skip bar, causes the card carriage to be skipped over the mentioned column (19–64). When the punch carriage is brought to rest at the "65" column, sensing operations can be initiated by plugging the conducting segment for this position, by means of plug connector 224, to the "start" plug socket, and relay R48. This control circuit for starting automatically the sensing operations was traced in detail hereinbefore, and need not be repeated at this time. It should be mentioned, that upon commencement of the said skipping operation, the circuit to relay 47 is broken, and the floating cam contacts FC are opened thus causing the said relays R1, R47, SHR and SR to be restored to the normal condition.

*"X" skip operations.*—Instead of tabulating or skipping under control of relay 47 as just described, it might be desired to initiate skip operations, upon sensing of the "figures" "G" signal, and punch an "X" perforation in the record card. Assume for this description, that, instead of skipping columns 19 to 64 as described under the preceding heading "Tabulating operations," skipping of these columns is to be effected under control of relay 54 (Fig. 14F), and that the plug connector 223 is connected to the "stop" (X-Skip) plug socket instead of the "stop" (Tab) plug socket.

Now, upon sensing the "figures" "G" designations, the "figures" supervisory relays R43—R46 are energized first, as set forth hereinabove. Next, the "G" distributing relay R22 is energized and locked, as described in the preceding section. Upon closure of contacts R22c, a circuit is completed from the cam contacts FC through conductors 201 and 220, contacts R22c, transferred contacts R44b, conductor 222, pick-up coil of relay R54, said plug connector to the "19" conducting segment 167, brushes 168, common conducting strip 166 to conductor 203, energizing said relay. A holding circuit for this relay is established from said conductor 201 through contacts R54c, holding coil of relay R54, and conductors 228 and 203.

Contacts R54a open the holding circuit to relay R2 causing the circuit to latch magnet 63 to be opened, thereby preventing further energizations of this magnet, by cam contacts C1, and further sensing operations, until contacts R54a are closed. Closure of contacts R54b (Fig. 14E) completes a circuit from the floating cam contacts FC through conductor 201, contacts R54b, conductor 209 to the "X" duplicating magnet 115, causing an "X" perforation to be formed in the record card. A circuit is also completed through the normally closed contacts R47a to the coil of relay R1 (Fig. 14A), energizing the latter. Closure of contacts 1b establishes a circuit to relay SR, as traced hereinabove, which relay, in turn, causes the skip magnet 171 to be energized through contacts SR2. Upon energization of the skip magnet, and by means of a suitable skip bar, the card carriage is skipped over the mentioned columns. The start circuit for the latch magnet 63, when the card carriage reaches column "65," was described in the preceding section, and need not be repeated at this time.

*Additional skip and duplicating operations.*—Assume now, that columns 65 and 66 are to be punched with data in statistical code under control of the telegraphic tape, in the manner set forth hereinabove; and, that columns 68 to 75 are to be skipped, under control of an "X" perforation in a pattern or master card disposed in the duplicating rack. The feeding operations of the tape again must be suspended, while this skipping operation is taking place. Accordingly, a plug connection is made from the "67" column conducting segment 167 to the "stop" (Duplicate) plug socket, so that a circuit can be completed to relay 53, energizing the latter, when the card carriage is in this column position, as follows: conductor 200, latch contacts CT1, conductor 204, coil of relay R53, contacts DMR1 (which contacts are closed after the duplicating magnets 115 are energized), plug connection 225, the column "67" conducting segment 167, brushes 168, common conducting strip 166 and conductor 203. Contacts R53a, which are in the holding circuit for relay R2, are opened to break this holding circuit, causing contacts R2a to be opened, and preventing further energizations of the latch magnet 63, upon closures of the cam contacts C1. Thus, tape feeding operations are suppressed. However, before contacts DMR1 are closed, a circuit is completed to the "X" duplicating magnet 115 causing an "X" perforation to be formed in the "11" index point position of the "67" column of the card, as follows: conductor 200, latch contacts CT1, floating cam contacts FC, normally closed contacts R49a, contact roll 175, the "X" duplicating brush 176 cooperating with the "X" perforation in the master card M, the "X" magnet 115, coil of relay DMR to conductor 203, energizing said magnet and relay. Energization of the said relay permits the contacts DMR1 to be closed for completing the circuit to relay R53, as previously traced. Upon energization of the punch magnet 124, and by means of a skip bar, the card carriage is skipped from column 67 to column 76. The conducting segment 167 for this last mentioned column is then plugged, by means of connector 226, to the "start" plug socket causing energization of relay R48, and initiating automatically tape sensing and feeding operations, as set forth hereinbefore.

Obviously, from the description just given, the same control circuits can be established for any desired duplicating operations, under control of the master card M. That is, if it is desired to record on the statistical card certain information to be obtained automatically from the master card M, this operation can be effected precisely as described for the last mentioned skipping operations. For example, instead of employing a skip bar for skipping columns 68—75, these columns would be punched with the information obtainable from, and under control of, the master card.

*Column checking operations.*—In order to determine whether all the functional operations of the tape sensing and card perforating units are completed in unison, so-called column checking circuits are provided. By this arrangement, it can be determined whether or not the card carriage is finally positioned, in the column it normally should occupy, after completion of the sensing of the information on a predetermined section of the telegraphic tape. This is accomplished by employing a pattern or master card M, disposed in the duplicating rack, which card is provided with an "X" perforation in the column corresponding to the column position whereat the card carriage should be positioned, upon completion of punching the information sensed on the tape. If this predetermined position is occupied by the card carriage, upon completion of the punching operations, an "X" perforation is punched in the record card, and the card carriage is automatically skipped to the last column position.

To continue with the chosen example, assume that columns 76–78 inclusive are punched with information sensed on the telegraphic tape, which operations are fully understood at this point, and that column 79 is used for the mentioned checking purposes. Accordingly, a plug connection is provided from the "79" conducting segment 167 to the "Column check" plug socket, as indicated by connector 227. Upon closure of the cam contacts FC (which occurs after the card carriage is positioned to the "79" column), a circuit is established from conductor 200 to latch contacts CT1, said contacts FC, conductor 201, pick-up coil of relay R49, connector 227, the "79" conducting segment 167, brushes 168, common conducting strip 166 to conductor 203, energizing said relay. A holding circuit is established immediately from the latch contacts CT1, conductor 204, holding coil of relay R49, contacts R49b, conductor 228 to conductor 203, which is maintained until the latch contacts CT1 are opened. Contacts R49a are opened to break the circuit to the brush contact roll 175 of the duplicating rack. In this manner, the "X" duplicating magnet 115 is not energized presently, under control of the "X" perforation in the master card M. This control function is a positive one, in view of the fact, that relay R49 is faster in its operation than the said duplicating magnet, thus, before the latter is effectively energized, the operation of relay R49 is completed to cut off the circuit to this duplicating magnet.

Now, upon sensing the "carriage return" code signal in the tape (which, it is remembered, always follows the last item of information in a line punched in the telegraphic tape), the "4" sensing contacts 52 are closed to effect energization of relays R6 and R7. A circuit is then completed, upon closure of cam contacts C2, from the latch contacts CT1 to conductor 204, said contacts C2, conductor 206, normally closed contacts R3a, R4a, R5a, transferred contacts R6a, and normally closed contacts R8b to the pick-up coil of the "CR" distributing relay R13 and conductor 203. A holding circuit for this relay is established immediately through its contacts R13a and the floating cam contacts FC, as previously traced. Closure of contacts R13b permits a circuit to be completed from the latch contacts CT1 to cam contacts FC, conductors 201 and 220, said contacts R13b, conductor 229, pick-up coil of relay R50, connector 227, the "79" conducting segment 167, brushes 168, common conducting strip 166 to conductor 203, energizing the said relay. A holding circuit is established immediately from the latch contacts CT1 via conductor 204 and contacts R50a to conductors 228 and 203.

Obviously, relay R50 could not be picked up, at this time, if the card carriage rested at any other position than the column "79" position. Upon energization of relay R50, the contacts R50b are transferred for the following control purposes. After sensing the "carriage return" code signal, it is remembered, that a "line feed" signal follows immediately thereafter, which "line feed" signal when sensed causes the translating relay R4 to be picked up, through the "2" sensing contacts 52. Upon closure of cam contacts C2, the latch contacts CT1 are connected by the said contacts and conductor 206 to normally closed contacts R3a, transferred contacts R4a, normally closed contacts R5b, R6c, and R9a to the "L. F." distributing relay R19 pick-up coil, energizing this relay. The usual distributing relay holding circuit through contacts R19a and the holding coil of relay R19 is immediately established. A circuit is then completed from the floating cam contacts FC through conductors 201 and 220, contacts R19b, conductor 230, transferred contacts R50b, pick-up coil of relay R52 and conductors 228 and 203, energizing the said relay. A holding circuit from latch contacts CT1 is established via conductor 204, holding coil of relay R52, contacts R52c and conductors 228 and 203.

Opening of contacts R52b breaks the described holding circuit for relay R2, and in turn, causes the circuit to the latch magnet 63 to be opened, so that further tape sensing and feeding operations are suspended. Closure of contacts R52a permits a circuit to be established from conductor 200 to latch contacts CT1, floating cam contacts FC, said contacts R52a, contact roll 175, "X" brush 176 to the "X" magnet 115. This magnet is now effectively energized to cause an "X" perforation to be punched in the "79" column in the card. A circuit is also completed from the "X" brush 176 to normally closed contacts R47a and relay R1, energizing this relay, and by means of contacts R1b causing the skip relay SR to be energized, as described hereinabove, thereby causing the skip magnet to be energized. Thus, by means of a suitable skip bar, the card is skipped to the last column position to effect closure of the last column contacts LC.

As mentioned, had the card carriage not been properly positioned, after punching of the information sensed on the telegraphic tape, relay R50 could not have been energized to permit the described controlling circuits to be established. The non-unison operations of the tape sensing and card punch units are positively detected by establishing a circuit, upon sensing of the said "line feed" signal, from the "L. F." distributing relay contacts R19b via conductor 230, normally closed contacts R50b, coil of relay R51 and conductors 228 and 203, energizing this relay. Contacts R51a, included in the holding circuit for relay R2, are then opened to break this holding circuit, and prevent further energization of the latch magnet 63. Thus, it is seen that further tape sensing and feeding operations are arrested until such time when the apparatus receives the attention of an operator for correcting the faulty condition.

Now, resuming with the closure of the last column contacts LC, a circuit is completed to the eject magnet 143, energizing this magnet and initiating the described and well known card ejecting operations. The automatic start contacts AC are closed, during card ejection operations, to effect energization of the trip magnet 153. Upon energization of the trip magnet, it is remembered, the latch contacts CT1 are opened and CT2 are closed. The latter close a circuit to the punch motor M, whereupon the card carriage is returned to pick up a new card from the hopper and is positioned in the first column position. It should have been stated, that, when the card carriage is skipped to the last column position, the floating cam contacts FC are opened, and are held open, as is well known, until the card carriage is in the first column position. Opening of the said cam contacts FC breaks the mentioned holding circuits to the said distributing relays R13 and R19. Opening of latch contacts CT1 breaks the holding circuits to said relays R49, R50 and R52. In this manner, the apparatus is now restored to normal, and conditioned for further automatic tape sensing and card perforating operations, which operations are effected as described herein upon the positioning of the next card to the first column position.

While there have been shown and described and pointed out the fundamental novel features of the invention as applied to a single modification, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for perforating a sheet in statistical code controlled by a tape having transverse rows of alphabetical and numerical character code designations recorded thereon in telegraphic code, said designations being preceded by letters and figures key code designations, respectively, comprising means for sensing the said rows of code designations, said sensing means including a plurality of electrical switching means, one for each unit of the telegraphic code, statistical sheet perforating means having a plurality of electromagnetic control means for effecting recording of the character designations in statistical code, a plurality of control circuits, one for each unit of the statistical code, each control circuit including one of said electromagnetic control means, means for translating said telegraphic character designations into statistical code including a plurality of translating relay means selectively controlled by the said switching means and a group of distributing relay means, one for each character designation sensed, selectively controlled by the said translating relay means and connected in circuit relationship with the said control circuits for selectively controlling the energizations of the said circuits and electromagnetic control means, supervisory relay means cooperating with the said control circuits for conditioning the latter, whereby the distributing relay means are normally effective for causing the said electromagnetic means to be energized in accordance with the sensed alphabetical character designations, means under control of the translating relay means, upon the sensing of the figures key designations, for effecting energization of the said supervisory relay means for altering the conditioning of the control circuits whereby the said electromagnetic means are controlled by the distributing relays means and energized in accordance with the sensed numerical character designations, means for maintaining the supervisory relay means energized and effective for the immediate subsequently sensed numerical character designations, and additional supervisory means under control of the translating relay means, upon the sensing of the letters key code designations, for effecting deenergization of the first mentioned supervisory relay means and restoring the control circuits to the mentioned normal condition.

2. Apparatus for perforating a sheet in statistical code controlled by a tape having transverse rows of alphabetical and numerical character code designations recorded thereon in telegraphic code, said designations being preceded by letters and figures key code designations, respectively, comprising means for sensing the said rows of code designations, said sensing means including a plurality of electrical switching means, one for each unit of the telegraphic code, statistical sheet perforating means having a plurality of electromagnetic control means for effecting recording of the character designations in statistical code, a plurality of control circuits, one for each unit of the statistical code, each control circuit including one of said electromagnetic control means, means for translating said telegraphic character designations into statistical code including a plurality of translating relay means selectively controlled by the said switching means and a group of distributing relay means, one for each character designation sensed, selectively controlled by the said translating relay means and connected in circuit relationship with the said control circuits for selectively controlling the energizations of the said circuits and electromagnetic control means, and supervisory means under control of the translating relay means, upon sensing of the letters and figures key designations, for controlling the conditioning of the said control circuits, whereby the said electromagnetic means are controlled by the distributing relay means and energized in accordance with the sensed alphabetical and numerical character designations for effecting recording of the latter in statistical code.

3. The invention set forth in claim 2 wherein cyclically operable means are provided for controlling the operations of the said translating relay means.

4. The invention set forth in claim 2 wherein a plurality of cyclically operable means are provided for controlling successively the operations of the said translating and distributing relay means.

5. The invention set forth in claim 2 wherein means are provided for feeding the telegraphic tape, step by step, and cyclically operable means for rendering the said feeding means effective at predetermined times during each cycle of operation.

6. The invention set forth in claim 2 wherein means are provided for feeding the telegraphic tape, step by step, and cyclically operable means for rendering the said sensing means effective at pretermined times during each cycle of operation, and thereafter rendering the said feeding means effective.

7. Apparatus for perforating a sheet in statistical code controlled by a tape having transverse rows of alphabetical and numerical character code designations recorded thereon in telegraphic code, said designations being preceded by letters and figures key code designations, respectively, comprising means for sensing the said rows of code designations, said sensing means including a plurality of electrical switching means, one for each unit of the telegraphic code, statistical sheet perforating means having a plurality of electromagnetic control means, a plurality of control circuits, one for each unit of the statistical code, each control circuit including one of said electromagnetic control means, circuit control means controlled by said switching means for translating the said telegraphic character designations into a statistical code and controlling the energizations of the said circuits and electromagnetic control means, said translating means including means normally arranged whereby the translating means and associated control circuits are effective for controlling the said electromagnetic means in accordance with the sensed alphabetical character designations, circuit supervisory means under control of the said switching means and responsive to the sensed figures key code designations for conditioning the translating means and said associated control circuits, whereby the said electromagnetic means are controlled in accordance with the sensed numerical character designations, means for maintaining the said figures key supervisory means effective for the immediate subsequently sensed numerical character designations, and additional supervisory means under control of the said switching means and responsive to the sensed letters key designations for restoring the said translating means and associated control circuits to normal and rendering the said figures key supervisory means ineffective.

8. The claim set forth in claim 7 wherein means are provided to be controlled by the said switching means upon the sensing of space code designations in the tape, means controlled thereby for effecting spacing operations of the statistical sheet perforating means, said space controlled means being arranged whereby the said figures and letters supervisory means remain undisturbed during the operations of the former.

9. Apparatus for perforating a sheet in statistical code controlled by a tape having transverse rows of alphabetical and numerical character code designations recorded thereon in telegraphic code, said designations being preceded by letters and figures key code designations, respectively, comprising means for sensing the said rows of code designations, said sensing means including a plurality of electrical switching means, one for each unit of the telegraphic code, statistical sheet perforating means having a plurality of electromagnetic control means, a plurality of control circuits, one for each unit of the statistical code, each control circuit including one of said electromagnetic control means, circuit control means controlled by said switching means for translating the sensed telegraphic character designations into a statistical code and controlling the energizations of the said circuits and electromagnetic control means, said translating means including means normally arranged whereby the translating means and associated control circuits are effective for controlling the said electromagnetic means in accordance with the sensed alphabetical character designations, and circuit supervisory means under control of the said switching means and responsive to the sensed figures key designations for conditioning the translating means and said associated control circuits, whereby the said electromagnetic means are controlled in accordance with the sensed numerical character designations.

10. Apparatus for perforating a sheet in statistical code controlled by a tape having transverse rows of alphabetical and numerical character code designations recorded thereon in telegraphic code, said designations being preceded by letters and figures key code designations, respectively, comprising means for sensing successively the said rows of code designations, means under the control of the sensing means for translating the sensed telegraphic character designations into a statistical code, statistical sheet perforating means, said translating means including means normally arranged whereby the translating means is effective for controlling the perforating means in accordance with the sensed alphabetical character designations, and means under control of the sensing means and responsive to the sensed figures key designations for supervising the translating means and conditioning the latter, whereby the perforating means is controlled in accordance with the sensed numerical character designations.

11. The invention set forth in claim 10 wherein means are provided for maintaining the said figures key supervisory means effective for the immediate subsequently sensed numerical character designations, and additional supervisory means under control of the sensing means and responsive to the letters key designations for restoring the translating means to normal and rendering the said figures key supervisory means ineffective.

12. Apparatus for perforating a sheet in statistical code controlled by a tape having transverse rows of alphabetical and numerical character code designations recorded thereon in telegraphic code, said designations being preceded by letters and figures key code designations, respectively, comprising means for sensing successively the said rows of code designations, means under the control of the sensing means for translating the sensed telegraphic character designations into a statistical code, statistical sheet perforating means controlled by the said translating means for recording the sensed characters in statistical code, and additional means under control of the said sensing means and responsive to the sensed letters and figures key designations for supervising the operations of the translating means, whereby the latter control the said perforating means in accordance with the sensed alphabetical and numerical character designations.

13. The invention set forth in claim 12 wherein the said additional means is arranged for preventing the said translating means from being effective to render the said perforating means operative whenever the letters and figures key designations are sensed.

14. The invention set forth in claim 12 wherein cyclically operable means are provided for rendering the said translating means effective.

15. The invention set forth in claim 12 wherein the said sensing means includes a plurality of electrical switching means, one for each unit of the telegraphic code, and the said translating means includes a plurality of individual circuits and circuit control means, one for each element of the statistical code, for controlling the operations of the said perforating means.

16. The invention set forth in claim 12 wherein means are provided for maintaining the said letters or figures supervisory means effective until the other key code designation is sensed for altering the supervisory action.

17. Apparatus for recording data in statistical code controlled by a tape having transverse rows of alphabetical and numerical data designations recorded therein in telegraphic code, said designations being preceded by letters and figures key code designations, respectively, comprising means for sensing successively the said rows of designations, means under the control of the sensing means for translating the sensed telegraphic data designations into a statistical code, statistical recording means controlled by the said translating means for recording the sensed data in statistical code, and additional means under control of the said sensing means and responsive to the sensed letters and figures key designations for supervising the operations of the translating means, whereby the latter control the said recording means in accordance with the sensed alphabetical and numerical data designations.

18. Apparatus for marking a sheet in a predetermined code controlled by a record having data designations recorded thereon in a different code comprising cyclically operable means for sensing the said data designations, means under control of the sensing means for translating the coded data designations into the said different code, sheet marking means controlled by the said translating means for recording the sensed data, in successive columns on the sheet, in the last mentioned code, and column read-out means included in the marking means for controlling the sensing means, whereby the sensing operations are suspended during certain functional operations of the said marking means, and then renewed upon completion of the said functional operations.

19. Apparatus for marking a sheet in a predetermined code controlled by a record having data designations recorded thereon in a different code comprising means for sensing the said data designations, means under control of the sensing means for translating the coded data designations into the said different code, sheet marking means controlled by the said translating means for recording the sensed data in the last mentioned code, said marking means including functional operation control means, read-out means included in said marking means, and means jointly controlled by said read-out and translating means for controlling the said functional operation control means upon the sensing of predetermined code designations on the record.

20. Apparatus for perforating a card in statistical code controlled by a tape having data designations recorded thereon in a permutative code comprising means for sensing the said data designations, means under control of the sensing means for translating the permutative code into the said statistical code, statistical card punch means controlled by said translating means for recording the sensed data in the last mentioned code, said punch means including a positionable card carriage and spacing control means therefor, read-out means also included in said punch means, and means jointly controlled by the said read-out and translating means, upon the sensing of predetermined code designations on said tape, for controlling the said spacing control means for effecting multiple spacing operations of the card carriage.

21. The invention set forth in claim 20 having cyclically operable sensing means, and means included in said jointly controlled means for controlling the sensing means, whereby sensing operations are suspended during the said multiple spacing operations, and means controlled by the read-out means for controlling the tape sensing means whereby sensing operations are renewed upon completion of the multiple spacing operations.

22. The invention set forth in claim 20 having additional means for controlling the said punch means, and means included in the said jointly controlled means for rendering the said additional means effective for controlling the punch means, and then rendering the said spacing control means operative for effecting multiple spacing operations.

23. The invention set forth in claim 20 having a master card and related sensing means for controlling the said punch means, and means included in the said jointly controlled means for rendering the master card sensing means effective for controlling the punch means, and then rendering the said spacing control means operative for effecting multiple spacing operations.

24. Apparatus for perforating a card in statistical code controlled by a tape having data designations recorded thereon in a permutative code comprising means for sensing the said data designations, means under control of the sensing means for translating the permutative code into the said statistical code, statistical card punch means controlled by said translating means for recording the sensed data in the last mentioned code, additional means for controlling the said punch means comprising a master card and related sensing means, read-out means included in said punch means, means jointly controlled by the said read-out and translating means, upon the sensing of predetermined code designations on said tape for controlling the tape sensing and the master card sensing means whereby tape sensing operations are suspended and master card sensing operations are effected for controlling the operations of the punch means, and means under control of the read-out means for controlling the said sensing means, upon completion of a predetermined number of the last mentioned punch means operations, whereby the said tape sensing operations are renewed and master card sensing operations are suspended.

25. Apparatus for perforating a card in statistical code controlled by a tape having individual messages consisting of rows of data designations recorded thereon in telegraphic code, said tape having special code designations at the end of each message, comprising means for feeding the tape step by step, means for sensing successively the rows of coded data designations on the tape, means under control of the sensing means for translating the telegraphic code into the said statistical code, card punching means having punch elements and a positionable card carriage, means for advancing the carriage so that the columns of the card are presented successively to the punch elements, means controlled by the translating means for rendering the punch elements operative for punching the sensed data in the columns presented thereto, read-out means controlled by the said carriage, additional means controlled by the translating means upon sensing the special code designations at the end of the message, and means jointly controlled by the said read-out and additional means for checking the column position of the positionable card carriage upon completion of the punching operations.

26. The invention set forth in claim 25 wherein one of the said special code designations comprises a "carriage return" signal.

27. The invention set forth in claim 25 wherein the said special code designations comprise a "carriage return" signal followed by a "line feed" signal.

28. The invention set forth in claim 25 wherein the special code designations comprise a "carriage return" signal followed by a "line feed" signal, and the said jointly controlled means comprise means successively controlled under the influence of the "carriage return" and "line feed" signals.

29. The invention set forth in claim 25 having card ejecting means, and means controlled by the said jointly controlled means for rendering the card ejecting means operative when the operations of the tape feeding means and card carriage advancing means are determined to have been completed in unison.

30. Apparatus for perforating a card in statistical code controlled by a tape having individual messages consisting of rows of data designations recorded therein in telegraphic code, said tape having special code designations at the end of each message, comprising means for feeding the tape step by step, means for sensing successively the rows of coded data designations on the tape, means under control of the sensing means for translating the telegraphic code into the said statistical code, card punching means having punch elements and a positionable card carriage, means for advancing the carriage so that the columns of the card are presented successively to the punch elements, card ejecting means, means controlled by the translating means for rendering the punch elements operative for punching the sensed data in the columns presented thereto, read-out means controlled by the said carriage, individual means controlled successively by the said translating means upon sensing the special code designations at the end of the message, means jointly controlled by the said read-out means and the first controlled individual means for checking the column position of the positionable card carriage upon completion of the punching operations, and control means controlled by the said jointly controlled means and the second controlled individual means for rendering the card ejecting means operative when the operations of the tape feeding means and card carriage advancing means are determined to have been completed in unison.

31. The invention set forth in claim 30 wherein the said special code designations comprise a "carriage return" signal followed by a "line feed" signal.

32. The invention set forth in claim 30 having means influenced by the said control means for rendering the tape feeding and sensing means ineffective during card ejecting operations.

33. The invention set forth in claim 30 having means influenced by the said control means for rendering the tape feeding and sensing means ineffective during card ejecting operations, means controlled by the said ejecting means for returning the card carriage to the first column position and under control of the said advancing means, and means controlled by said read-out means for renewing tape feeding and sensing operations upon completion of the card carriage returning operations.

34. Apparatus for perforating a card in statistical code controlled by a tape having individual messages consisting of rows of data designations recorded thereon in telegraphic code comprising means for feeding the tape step by step, means for sensing successively the rows of coded data designations on the tape, means under control of the sensing means for translating the telegraphic code into the said statistical code, card punching means having punch elements and a positionable carriage, means for advancing the carriage so that the columns of the card are presented successively to the punch elements, means controlled by the translating means for rendering the punch elements operative for punching the sensed data in the columns presented thereto, read-out means controlled by said carriage, and means controlled by said read-out means and responsive to certain code designations at the end of each message for checking the column position of the positionable carriage upon completion of the card punching operations.

35. Apparatus for perforating a card in statistical code controlled by a tape having rows of data designations of individual messages recorded thereon in permutative code comprising means for feeding the tape step by step, means for sensing successively the rows of coded data designations on the tape, means under control of the sensing means for translating the permutative code into the said statistical code, card punching means having punch elements, a positionable carriage and control means for advancing the carriage so that the columns of the card are presented successively to the punch elements upon each operation of the latter, means controlled by the translating means for rendering the punch elements operative for punching the sensed data in the columns presented thereto, control means responsive to certain code designations at the end of each message, means jointly controlled by the last mentioned control means and said punching means for checking the column position of the positionable carriage, upon completion of the card punching operations.

36. Apparatus for perforating a card in statistical code controlled by a tape having rows of data designations of individual messages recorded thereon in permutative code comprising means for feeding the tape step by step, means for sensing successively the rows of coded data designations on the tape, means under control of the sensing means for translating the permutative code into the said statistical code, card punching means having punch elements, a positionable carriage and control means for advancing the carriage so that the columns of the card are presented successively to the punch elements upon each operation of the latter, means controlled by the translating means for rendering the punch elements operative for punching the sensed data in the columns presented thereto, means responsive to certain code designations at the end of each message for checking the column position of the positionable carriage, and means for rendering the checking means effective upon completion of the card punching operations.

37. Apparatus for marking a sheet in statistical code controlled by a record having the data designations of individual messages recorded thereon in permutative code comprising means for feeding the record step by step, means for sensing successively the coded data designations on the record, means under control of the sensing means for translating the permutative code into the said statistical code, sheet marking means having marking elements, a positionable carriage and control means for advancing the carriage so that the columns of the sheet are presented successively to the marking elements upon each operation of the latter, means controlled by the translating means for rendering the marking elements operative for recording the sensed data in the columns presented thereto, means responsive to certain code designations at the end of each message for checking the column position of the positionable carriage, and means for rendering the checking means effective upon completion of the sheet marking operations.

38. Apparatus for perforating a card in statistical code controlled by a tape having data designations recorded thereon in a permutative code comprising means for sensing the said data designations, means under control of the sensing means for translating the permutative code into the said statistical code, statistical card punch means controlled by said translating means for recording the sensed data in the last mentioned code, additional means for controlling the said punch means, and means jointly controlled by the punch and translating means, upon the sensing of predetermined code designations on said tape for rendering the tape sensing means ineffective and the said additional means effective for controlling the punch means.

39. Apparatus for perforating a card in statistical code controlled by a tape having data designations recorded thereon in a permutative code comprising means for sensing the said data designations, means under control of the sensing means for translating the permutative code into the said statistical code, statistical card punch means controlled by said translating means for recording the sensed data in the last mentioned code, additional means for controlling the said punch means, read-out means included in said punch means, and means jointly controlled by the said read-out and translating means, upon the sensing of predetermined code designations on said tape for controlling the tape sensing means, whereby tape sensing operations are suspended and for controlling the said additional means, whereby the latter is rendered effective for controlling the operations of the punch means.

40. The invention set forth in claim 39 having additional means controlled by the said read-out means for controlling the tape sensing means, upon completion of a predetermined number of the last mentioned punch means operations, whereby the said tape sensing operations are renewed.

41. Apparatus for perforating a sheet in statistical code controlled by tape having rows of data designations recorded thereon in telegraphic code, comprising reciprocable tape sensing means, constantly rotated operating means for reciprocating the same, means under control of the sensing means for translating the sensed data designations into a statistical code, statistical sheet perforating means controlled by said translating means for recording the sensed data in statistical code, means normally capable of locking said tape sensing means each cycle against reciprocation by said operating means, means actuated by said constantly rotating means to release said locking means each cycle to permit repeated operation of said tape sensing means, and means to disable said releasing means.

42. The invention set forth in claim 41, wherein cyclically operable means are provided for rendering the translating means effective each operation of the perforating means.

43. The invention set forth in claim 41, wherein said sensing means includes a plurality of electrical switching means, one for each unit of the telegraphic code, and said translating means includes a plurality of individual circuits and circuit control means, one for each element of the statistical code, for controlling the operations of said perforating means.

44. The invention set forth in claim 41, wherein functional-operation control means are provided for causing said sheet perforating means to perform predetermined functional operations, and means whereby said disabling means is operated in conjunction with said functional-operation control means to render said sensing means inoperative during said functional operations.

45. The invention set forth in claim 41, wherein functional-operation control means are provided for causing said sheet perforating means to perform predetermined functional operations, means whereby said disabling means is operated in conjunction with said functional-operation control means to render said sensing means inoperative during said functional operations, and means for automatically restoring said disabling means upon completion of said functional operations to render said sensing means cyclically operative again.

46. The invention set forth in claim 41, wherein said perforating means includes readout means, and means whereby said disabling means is controlled by said readout means to render said sensing means inoperative or operative.

47. In a recording apparatus, means for producing code signals including a group of code elements and means for operating said code elements singly and in combinations, translating means controlled by the code signals produced by said code elements, recording means comprising a group of recording elements selectively operated under control of said translating means, and supervisory means operated under control of said translating means on response of the latter to a key code signal, for modifying the selective operation of said recording elements in response to code signals subsequently controlling said translating means, so that each of certain code signals causes the operation of a different recording element, or combination of recording elements, than it did before said key code signal was received.

48. In a recording apparatus, means for producing code signals including a group of code elements and means for operating said code elements singly and in combinations, translating means controlled by the code signals produced by said code elements, recording means comprising a group of recording elements selectively operated under control of said translating means, and supervisory means normally conditioning the selective operation of said recording elements and operable under control of said translating means, on response of the latter to a key code signal, to change the selective operation of said recording elements in relation to the code signals.

49. In a recording apparatus, means for producing code signals including a group of code elements and means for operating said code elements singly and in combinations, translating means controlled by the code signals produced by said code elements, recording means comprising a group of recording elements selectively operated under control of said translating means, supervisory means operated under control of said translating means on response of the latter to a key code signal, for modifying the selective operation of said recording elements in response to code signals subsequently controlling said translating means, so that each of certain code signals causes the operation of a different recording element, or combination of recording elements, than it did before said key code signal was received, and means operable under control of said translating means, on response of the latter to a second key code signal, for restoring said supervisory means to normal condition.

CHARLES R. DOTY.
EDWARD J. RABENDA.